(12) United States Patent
Khajuria

(10) Patent No.: US 10,564,840 B2
(45) Date of Patent: Feb. 18, 2020

(54) METHOD AND APPARATUS FOR CONTEXT-BASED USER INTERACTION ON A TOUCH-INPUT ENABLED DEVICE

(71) Applicant: Samsung Electronics Co., Ltd., Gyeonggi-do (KR)

(72) Inventor: Brij Bhushan Khajuria, Noida (IN)

(73) Assignee: Samsung Electronics Co., Ltd (KR)

( * ) Notice: Subject to any disclaimer, the term of this patent is extended or adjusted under 35 U.S.C. 154(b) by 15 days.

(21) Appl. No.: 15/908,015

(22) Filed: Feb. 28, 2018

(65) Prior Publication Data

US 2018/0246640 A1    Aug. 30, 2018

(30) Foreign Application Priority Data

Feb. 28, 2017  (IN) .......... 201711007118 PS
Apr. 7, 2017   (IN) .......... 201711007118 CS

(51) Int. Cl.
| | | |
|---|---|---|
| G06F 3/0488 | (2013.01) | |
| G08B 21/24 | (2006.01) | |
| G06F 3/0486 | (2013.01) | |
| G06F 3/0484 | (2013.01) | |
| G06F 3/0482 | (2013.01) | |

(52) U.S. Cl.
CPC ........ *G06F 3/04883* (2013.01); *G06F 3/0482* (2013.01); *G06F 3/0486* (2013.01); *G06F 3/04847* (2013.01); *G06F 3/04886* (2013.01); *G08B 21/24* (2013.01)

(58) Field of Classification Search
CPC .................................................. G06F 3/04883
USPC ....................................................... 715/863
See application file for complete search history.

(56) References Cited

U.S. PATENT DOCUMENTS

| | | | |
|---|---|---|---|
| 6,477,117 B1 | 11/2002 | Narayanaswami et al. | |
| 6,593,942 B1 | 7/2003 | Bushmitch et al. | |
| 7,907,476 B2 | 3/2011 | Lee | |
| 9,146,674 B2 * | 9/2015 | Karlsson | G06F 3/04883 |
| 2010/0157742 A1 | 6/2010 | Relyea et al. | |

(Continued)

FOREIGN PATENT DOCUMENTS

| | | |
|---|---|---|
| JP | 2003-085530 | 3/2003 |
| KR | 1020110012360 | 2/2011 |

(Continued)

OTHER PUBLICATIONS

International Search Report dated Jun. 7, 2018 issued in counterpart application No. PCT/KR2018/002489, 9 pages.

*Primary Examiner* — William D Titcomb
(74) *Attorney, Agent, or Firm* — The Farrell Law Firm, P.C.

(57) ABSTRACT

Disclosed is a method and system in a touch-screen enabled computing device for rendering access to utilities, including sensing by a computing device at least one of a user input, and an event-occurrence in relation to said computing device. A first type of control element based on sensing is automatically displayed within a current screen area and is movable within the screen area. A user interaction is received in the screen area by a dragging of said control element to a designated parameter located within the screen area and associated with said first type of control element. At least one function of the computing device or a device connected thereto is executed based on a linkage of said first type of control element with the parameter.

22 Claims, 21 Drawing Sheets

(56) References Cited

U.S. PATENT DOCUMENTS

| | | | |
|---|---|---|---|
| 2010/0269040 A1 | 10/2010 | Lee | |
| 2012/0066629 A1 | 3/2012 | Lee et al. | |
| 2014/0139422 A1* | 5/2014 | Mistry | G06F 3/014 345/156 |
| 2014/0325437 A1* | 10/2014 | Pacenta | G06F 3/04883 715/793 |
| 2015/0049033 A1* | 2/2015 | Kim | G06F 3/041 345/173 |
| 2015/0261376 A1* | 9/2015 | Kim | G06F 3/0487 345/173 |
| 2015/0309704 A1* | 10/2015 | Bae | G06F 1/1677 715/765 |
| 2015/0379964 A1* | 12/2015 | Lee | G09G 5/12 345/173 |
| 2016/0110047 A1 | 4/2016 | Yoon et al. | |
| 2016/0110056 A1* | 4/2016 | Hong | G06F 3/04812 715/768 |

FOREIGN PATENT DOCUMENTS

| | | |
|---|---|---|
| KR | 1020160017907 | 2/2016 |
| KR | 1020160044978 | 4/2016 |
| KR | 1020170014904 | 2/2017 |

\* cited by examiner

METHOD AND APPARATUS FOR CONTEXT-BASED USER INTERACTION ON A TOUCH-INPUT ENABLED DEVICE

PRIORITY

This application is based on and claims priority under 35 U.S.C. § 119(e) to an India Provisional Patent Application filed in the India Intellectual Property Office on Feb. 28, 2017 and assigned Serial No. 201711007118, and to an India Complete Patent Application filed in the India Intellectual Property Office on Apr. 7, 2017 and assigned Serial No. 201711007118, the contents of each of which are incorporated herein by reference.

BACKGROUND

1. Field of the Disclosure

The present disclosure relates generally to a device having a computing-architecture, and in particular, to a computing device exhibiting small touch-sensitive surfaces.

2. Description of the Related Art

Handheld devices including smartphones and tablets can execute a wide-range of activities and tasks as per the user's convenience. The advent of wearable devices, including the smartwatch, takes such execution to another level.

A smartwatch is essentially a watch having a computing architecture and is adapted to exhibit a plurality of complex functions in addition to keeping time. The main benefit of a smartwatch is that it constantly updates the user with telecommunication as well as data-related communication, while requiring minimal user interaction, and it provides the user a readily-available alternate user interface (UI) to remotely operate the smartphone.

Nonetheless, performing basic utilities such as accessing a phone-book or making a phone call through the smartwatch involves multiple steps, since the watch's dial/home screen user interface (UI) renders minimal control options in a small screen area, despite utility access being Menu-driven, such as in the manner of the smartphone. Raw data or primary data-input is provided through a keypad/voice input/watch bezel, which is cumbersome to users. Moreover, the small display unit of the smartwatch for rendering the UI is only operable by one hand, since the watch is strapped onto the other arm. As such, performing even basic tasks through a smartwatch is inconvenient and time-consuming.

Users often experience declined use of the smartwatch, since the users eventually realize how much easier it is to access the same functions on the synced smartphone. As a result, an evolved technology becomes under-utilized and the user incurs a financial loss.

As such, there is a need in the art for a mobile device or smartwatch having an interface requiring minimal user interaction, yet rendering many controllable-functions accessible through a dial/home-screen UI.

SUMMARY

An aspect of the present disclosure is to address at least the above-mentioned problems and/or disadvantages and to provide at least the advantages described below. Accordingly, an aspect of the present disclosure is to provide a touch-screen enabled mobile device with minimal user inputs that nonetheless provide a plurality of functionalities.

Another aspect of the present disclosure is to provide a touch-screen enabled mobile device that provides a plurality of functionalities through direction based user-gestures.

In an embodiment, a method and a system implemented in a touch-screen enabled computing device for rendering access to utilities thereof includes sensing at least one of a user input and an event occurring within a screen area of the first device, displaying a first type of control element on the screen area based on the sensing, the first of control element being movable within the screen area, receiving a user interaction on the screen area, the user interaction including a dragging of the first type of control element to a designated parameter located within the screen area and associated with the first type of control element, and executing at least one function of the first device or a second device connected to the first device based on a linkage of the first type of control element with the designated parameter.

In another embodiment, a first device includes a sensor configured to sense at least one of a user input and an event occurring within a screen area of the first device, a display configured to display a first type of control element on the screen area based on the sensing, the first of control element being movable within the screen area, a receiver configured to receive a user interaction on the screen area, the user interaction including a dragging of the first type of control element to a designated parameter located within the screen area and associated with the first type of control element, and a processor configured to execute at least one function of the first device or a second device connected to the first device based on a linkage of the first type of control element with the designated parameter.

BRIEF DESCRIPTION OF THE DRAWINGS

These and other aspects, features, and advantages of the present disclosure will become better understood when the following detailed description is read with reference to the accompanying drawings, in which.

DETAILED DESCRIPTION

Figure 1:
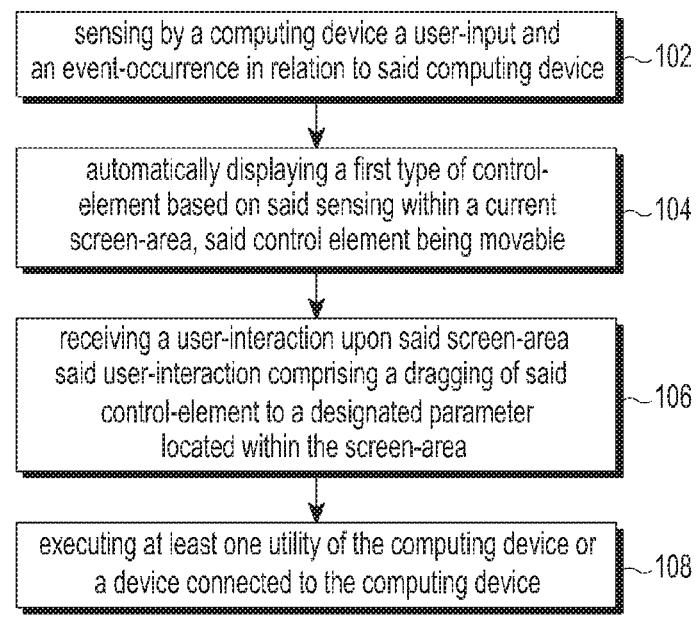
FIG. 1 illustrates a method of executing at least one function of a device according to a first embodiment.

The following description with reference to the accompanying drawings is provided to assist in a comprehensive understanding of embodiments of the present disclosure, including various specific details of examples to assist in that understanding. Accordingly, those of ordinary skill in the art will recognize that various changes and modifications of the embodiments described herein can be made without departing from the scope and spirit of the present disclosure. In addition, descriptions of well-known functions and constructions may be omitted for the sake of clarity and conciseness.

It will be understood by those skilled in the art that the foregoing general description and the following detailed description are explanatory of the present disclosure and are not intended to be restrictive thereof.

Further, skilled artisans will appreciate that elements in the drawings are illustrated for simplicity and may not have been drawn to scale. For example, the flow charts illustrate the method in terms of the most prominent steps involved to assist in understanding of aspects of the present disclosure. In terms of the construction of the device, at least one component of the device may have been represented in the drawings by conventional symbols, and the drawings may show only those specific details that are pertinent to understanding the embodiments so as not to obscure the drawings with unnecessary details that will be readily apparent to those of ordinary skill in the art.

Reference throughout this specification to "an aspect", "another aspect" or similar expressions indicates that a particular feature, structure, or characteristic described in connection with the embodiment is included in at least one embodiment of the present disclosure. Thus, expressions such as "in an embodiment" and "in another embodiment" throughout this specification may or may not refer to the same embodiment.

Terms such as "comprises" and "comprising" herein are intended to cover a non-exclusive inclusion, such that a process or method that comprises a list of steps does not include only those steps but may include other steps not expressly listed or inherent to such process or method. Similarly, at least one device, sub-system, element, structure, or component proceeded by "comprises . . . a" does not, without further recitation, preclude the existence of other or additional devices, sub-systems, elements, structures, or components.

Unless otherwise defined, all technical and scientific terms used herein have the same meaning as commonly understood by one of ordinary skill in the art to which the present disclosure pertains. The system, methods, and examples provided herein are illustrative only and not intended to be limiting.

The present disclosure describes a mechanism for enabling a context-based user interaction over a touch-sensitive surface of a mobile device. The mechanism renders a movable control element as a part of a mobile device UI, such as the dial/home-screen user interface of a smartwatch. The control element changes its visual forms based upon the context, utility being accessed, an event being handled or the users input. The movement of the control element as realized through drag and drop action is utilized to access an execution of the prevailing event. During the course of said movement or dragging of the control, the underlying UI changes to dynamically support the event being executed.

The raw data input for any utility or event is generated based upon how the control element has been dragged on the screen UI. More specifically, the UI includes hold points and drop points over which the movable control element is dragged to access a utility.

Based on the present disclosure, a user-friendly interface may be rendered at a mobile computing device such as a smartwatch to substantially assist a single-hand executed operation usually initiated by an index finger, and may achieve a plurality of functionalities through the smartwatch in a short span of time, despite the presence of a smaller display size at the smartwatch. The present disclosure eliminates many steps (e.g., touch inputs) required in the conventional art for traversing the menu of the smartwatch for accessing events or executing functions, by enabling a context-based, drag and drop manner of interacting with the device.

FIG. 1 illustrates a method implemented in a computing device including a touch-screen for rendering access to utilities, according to an embodiment. In step 102, the method begins by sensing, by the computing device, at least one of a user input and an event-occurrence in relation to the computing device. The user input may be a gesture interpretable by the computing device, such as a gesture drawn over the touch-sensitive surface of the computing device, at least one tap executed over a touch-sensitive surface defining a screen area, a long-press subjected to the touch-sensitive surface, a pre-defined physical-movement, such as shaking of a mobile device or movement imparted to a handheld mobile device in any direction by the user, and/or a user actuation of a control, such as a rotatable-bezel of a smartwatch or a control button, linked to the computing device by the user.

For example, the event may be an external or internal condition, such as a low-battery state, electronically influencing the computing device and/or a device connected to the computing device, or an environmental condition, such as rain or extreme temperatures, sensed by the computing device, a physiological-condition, such as heartbeat, pulse-rate, or temperature of the user as sensed by the computing device. Other examples of the event may include a storage-memory change with respect to the smartwatch and/or a connected device, a pre-set alarm performing its intended function as per schedule, a connection establishment of the smartwatch or the parent device with a remotely located device, a current location data of the smartwatch meeting a pre-defined location based condition, such as user of the mobile device reaching his or her office, and currently gathered sensor data meeting a pre-defined sensor based condition.

In step 104, the method includes automatically displaying at least a first type of control element based on the sensing within a screen area, the control element being movable or floatable within the screen area. Such display may be preceded by modification of a state of default-control element of the computing device so as to show the first type of control element in the pre-defined form.

In step 106, the method includes receiving a user interaction upon the screen area, wherein such user interaction includes a dragging of the first type of control element to a designated parameter located within the screen area and associated with the first type of control element. The first type of control element may be dragged onto the designated parameter or may be dragged adjacent to the designated parameter. The first type of control element as a part of such user interaction is dragged to the designated parameter defined by a designated location within the screen area. In the case of a smartwatch, the designated location may be a minute and/or hour display indicator or graduations as shown within the dial of the smartwatch/home screen UI.

The designated parameter may also be at least one second type of control element illustrated within the screen area and near the first type of control element, such as within the dial of the smartwatch, simultaneous with the display of the first type of control element.

The second type of control element may also be a movable control element that is dragged within the screen area as a part of additional user interactions, in the manner of the first type of control element, and may alternatively be an immovable stationary parameter, such as a static menu-option, that is adapted to receive the movable control element to register or update a condition with respect to the computing device. The displaying also includes depicting a description pertaining to the first and/or second type of control elements.

The dragging of the first type of control element as a part of the user-interaction with the screen area causes an automatic-change within the underlying UI and causes generation of raw-data based on the nature of the first type of control element and the designated location of the screen area in which the first type of control element has been dropped.

In step 108, the method includes executing at least one utility of the computing device or the connected device based on a linkage of the first type of control element with the parameter. Such may refer to setting up of a condition pertaining to an operation, such as alarms/reminders within the device, alteration of a preset condition with respect to an operation of the computing device or the connected device, such as management of notifications, telecommunications, applications, attributes, date and time and configuration of a service renderable by the mobile device, scheduling of telecommunication or data-communication related service, such as scheduling based on analysis of sensor data, a control of an operation of auxiliary devices, such as headphones or augmented-reality glasses, or a remotely-located device, such as washing-machines, air conditioners, or televisions having embedded systems.

As a part of execution of the utilities, at least one second type of control element may be rendered within the screen area along with a unique visual identifier or logo for each of the second type of control elements. Such identifier may be automatically selected for the second type of control element based on the nature of at least one condition set by the user or a type of service as scheduled to be executed by the user through the computing device. Moreover, each of the second type of control elements exhibits a color based on an associated priority, such that the priority may be based on an approaching schedule of occurrence of the condition or service and a significance of the condition or service with respect to the user and/or the computing device. For example, the second type of control elements most signifi-cant to the user or scheduled to occur in the near future may be color-coded as red, while those of less significant, and scheduled farther in the future are color-coded as green.

The identifiers as associated with each of the second type of control elements exhibit a visual alert upon attainment of the condition as associated with the second type of control element or a completion of the execution of the service. Moreover, the second type of control elements also facilitate the user to further configure or update the underlying condition or service.

Figure 2:
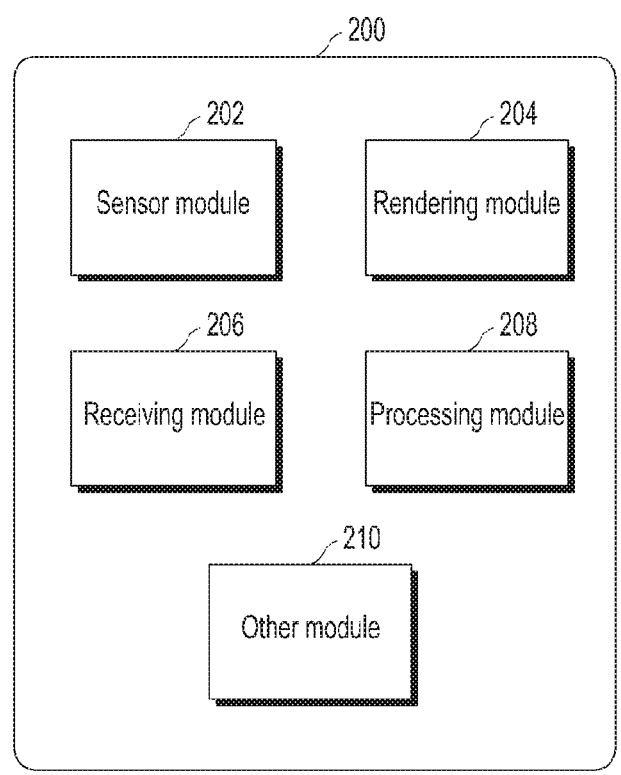
FIG. 2 illustrates a detailed internal construction of the system according to the first embodiment.

FIG. 2 illustrates a detailed internal construction of a system 200 according to an embodiment. In relation to the method in FIG. 1, the system 200 includes a sensing module 202 that performs step 102, a rendering module 204 that performs step 104, a receiving module 206 that performs step 106, and a processing module 208 that performs step 108. There may be other modules 210 within the system 200 that facilitate the operational interconnection among the modules 202 to 208, and perform other ancillary functions.

Figure 3:
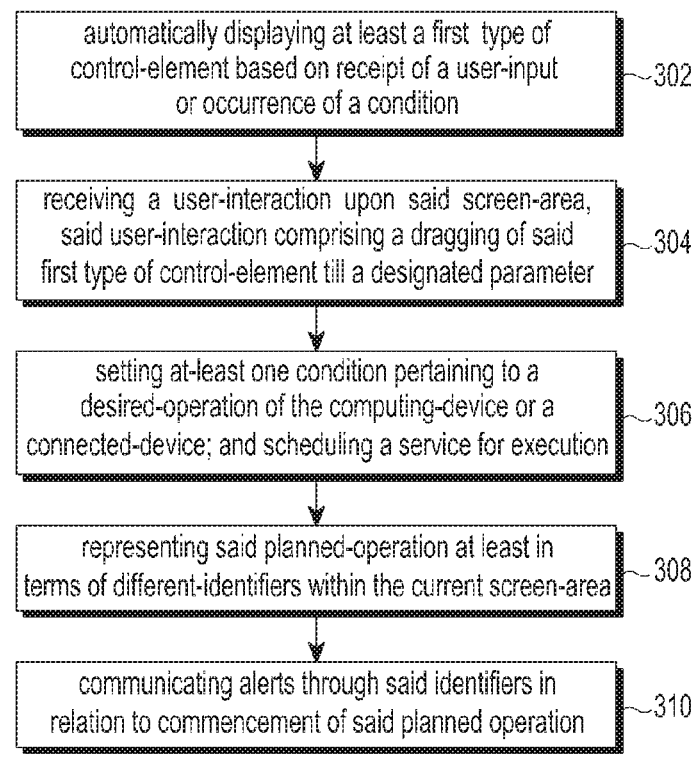
FIG. 3 illustrates a method of communicating alerts according to a second embodiment.

FIG. 3 illustrates a method implemented in a computing device as a touch-screen enabled device according to a second embodiment. In step 302, the method includes displaying at least a first type of control element based on receipt of a user input or occurrence of a condition. Such first type of control element is movable within a screen area of the computing device.

In step 304, the method includes receiving a user interaction upon said screen area, the user interaction comprising a dragging of the first type of control element to a designated parameter relevant to the first type of control element within the screen area.

In step 306, based on the user interaction of step 304, the method includes planning an operation of the computing device at least through setting up of at least one condition pertaining to a desired operation of the computing device or a connected device. Alternatively, as a part of planning the operation, the method may include scheduling a service for execution by the computing device or the connected device.

In step 308, the method includes representing the planned operation at least in terms of different identifiers within the screen area. Each of the identifiers may be color-coded or an icon or a combination of both, and represents at least one of particular user activities, or a mobile device operation as has been scheduled to occur. In step 310, the method includes communicating alerts through the identifiers in relation to commencement of the planned operation. The alerts may be communicated through displaying a color variation or any other type of visual alert in terms of the identifiers, coupled with sound/vibratory alerts through the mobile device.

Figure 4:
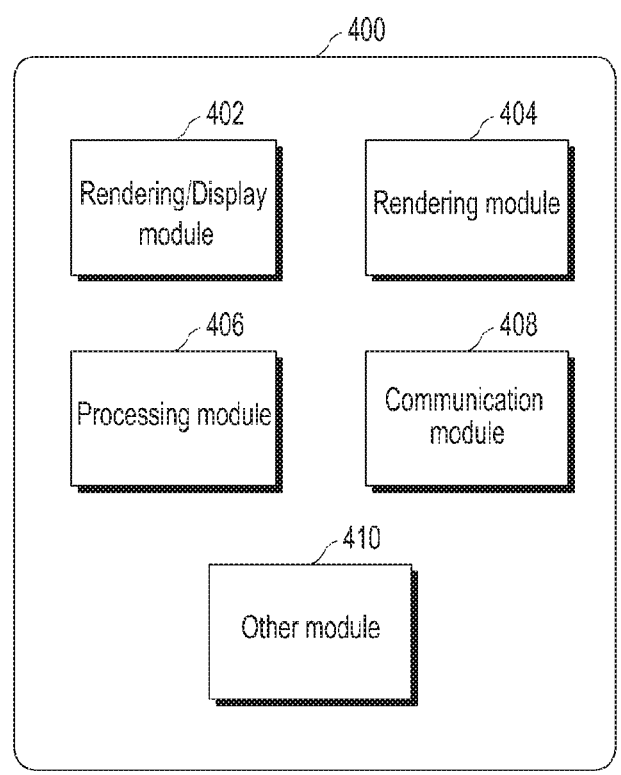
FIG. 4 illustrates a detailed internal construction of the system according to the second and third embodiments.

FIG. 4 illustrates a detailed internal construction of a system 400 according to an embodiment. in relation to the method in FIG. 3, the system 400 includes a rendering module 402 that performs steps 302 and 308, a receiving module 404 that performs step 304, a processing module 406 that performs step 306, and a communication module 408 that performs step 308. There may be other modules 410 within the system 400 that facilitates the operational interconnection among the modules 402 to 408, and perform other ancillary functions.

Figure 5:
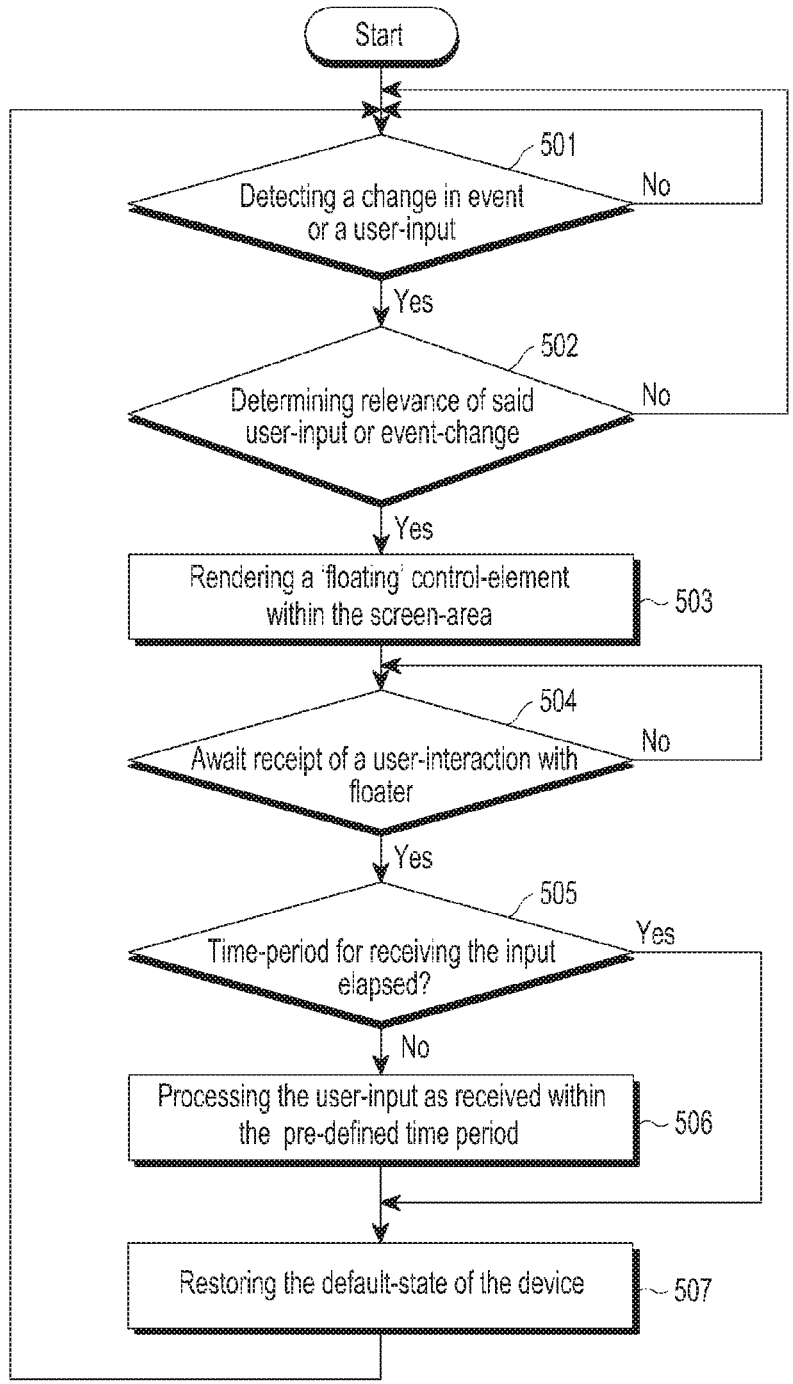
FIG. 5 illustrates an implementation of the method of FIG. 1 according to an embodiment.

FIG. 5 illustrates an implementation of method operations of FIG. 1 according to an embodiment, considering the computing device or the mobile device as being a smartwatch.

In step 501, it is determined whether a user actuation of the smartwatch or a change in event with respect to the smartwatch is detected. Examples of the user inputs provided as a part of user actuation of the smartwatch/mobile device and events have been shown with respect to step 102 in FIG. 1, to which step 501 corresponds. If the determination is "no", step 501 is repeated.

In step 502, if the determination in step 501 is "yes", it is determined whether the relevance of the user input and the change in event is determined. If the determination in step 502 is "yes", at least one type of control element based option is identified. If the determination is "no" in step 502, it is returned to the start.

In step 503, based upon the input or the event-change as has been observed in step 501, the control element is imparted a particular visual form, such as "floating", or positioned at a designated location within the UI rendered within the smartwatch. Such positioned control element is referred as the first type of control element as described in reference to FIG. 1.

In steps 504 and 505, the updated floating-element or the first type of control element is rendered within the UI for a pre-defined time period in order to await a receipt of a further user input, within said pre-determined time period, towards the control element and in the form of a gesture, such as drag and drop. Alternatively, the additional-gestures may be a touch-based gesture or a swiping gesture. Specifically, step 504 is repeated if a user input with the floater is not received, and if the time period for receiving the input elapsed in step 505, the method proceeds to step 507.

In step 506, if the time period for receiving the input has not elapsed in step 505, the user input is interpreted or processed to set at least one condition with respect to the control element, thereby setting at least one function of the smartwatch. The drag and drop gesture as executed is analyzed either in terms of an area covered during said dragging action or the location of drop, such as the drop-point of the drag and drop gesture, to derive said interpretation of input. Likewise, the touch-gesture may be analyzed based on the location contacted upon, and the swipe gesture may be analyzed based on the swipe direction. The condition as set may pertain to at least one mobile device or smartwatch characteristic, such as time, date, battery, display setting, display device profile, connectivity, functionality of the display device, notification, monitoring, location, and sensor input.

In step 507, upon having realized and completed the functionality as identified in step 506, the default state of the smartwatch as existing prior to step 501 is restored.

Figure 6:
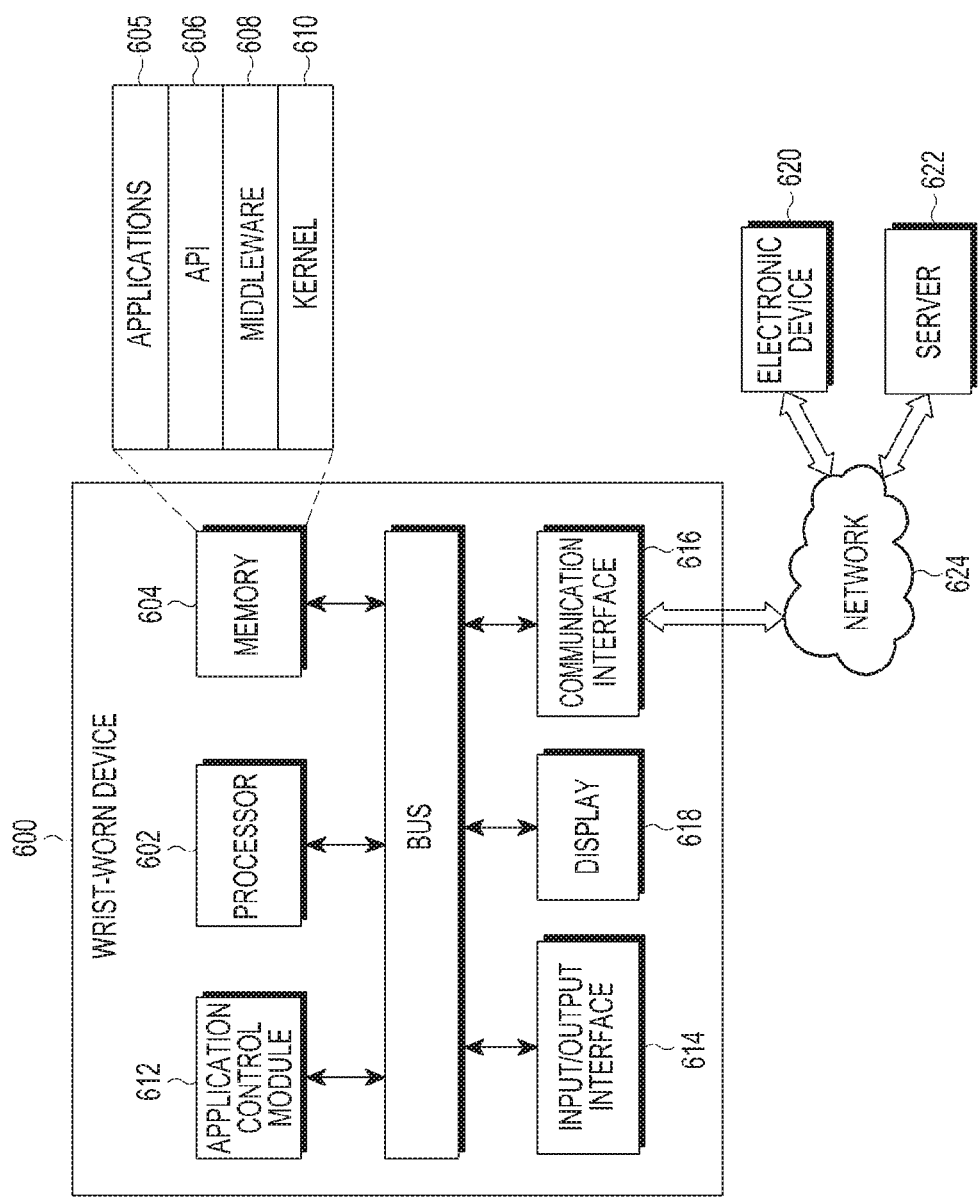
FIG. 6 illustrates an implementation of the system in FIG. 2 and FIG. 4 in a networking environment according to an embodiment.

FIG. 6 illustrates an implementation of the systems in FIG. 2 and FIG. 4 and the control flow in FIG. 5. The computing device 600, i.e., a wrist-worn device, comprises a processor 602 to execute system instructions, a memory unit 604 to store executable applications 605, one or more application programming interfaces (APIs) 606, middleware 608 and a kernel 610, an application control module 612 to manage running applications, an input/output interface 614 (i.e., a UI) for interaction with a user, a communication-interface 616 for communication with other devices (paired or connected devices) 620 or a remote server 622 through a network 624 and a display unit 618 to display visual-information.

In order to implement the control flow in FIG. 5, a plurality of modules referred to in FIG. 2 and FIG. 4 as a part of the application may be stored within the memory 604 to control various operations related to the movable/stationary control elements. Such operations include, but are not limited to:

Hiding or displaying the different type of movable or stationary control elements;
Changing visual form of the control elements;
Changing the position/orientation of the control elements based upon users input or context;
Changing the underlying in-use UI over which the control element is moved;
Displaying event-indicative points or icons further describing the control elements; and
Triggering other applications/functions, changing the devices attributes based upon the interaction of control element with the user.

The API 606 may be provided to be used with other applications to communicate with the control element to perform their own specific operations which include, but are not limited to:

Providing application-specific visual forms of control element and indicative logos/icons;
Providing information to generate the in-use UI across which the control element is moved during utility access;
Providing methods/functions to be triggered if the user interaction with control element requires an action to be performed; and
Accessing the control element related information.

The other applications (i.e. the third party applications) that utilize the API 606 may belong to the source device or to a paired or synchronized device connected to the source device via network.

Figure 7:
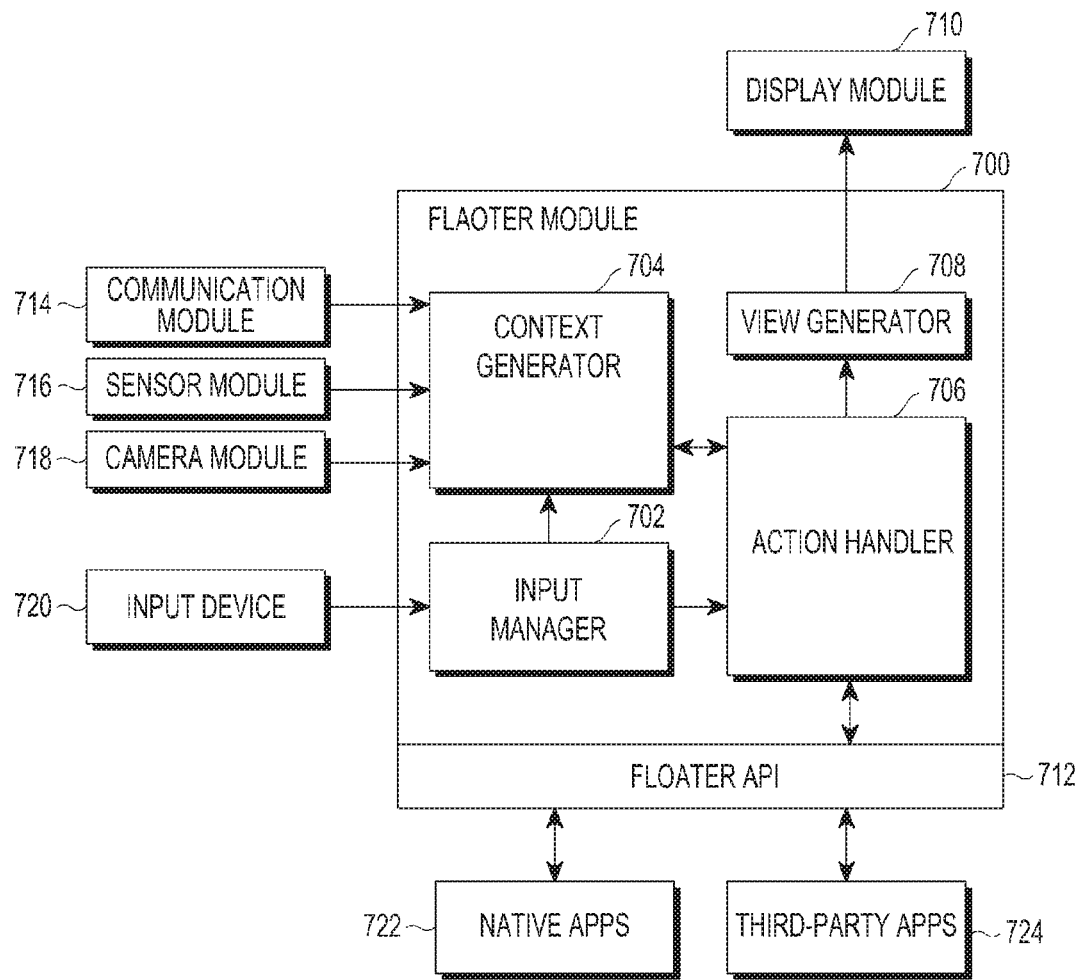
FIG. 7 illustrates an implementation of the system in FIG. 2 and FIG. 4.

FIG. 7 illustrates an implementation of the systems in FIG. 2 and FIG. 4 and refers an assembly of modules (202-208) and (402-408) as a floater module 700 which provides all the functionality related to the first/second type of control elements, which may be also referred as floating graphic elements. The various components of the floater module 700 may be listed and described as follows:

a) Input Manager 702 Corresponding to the Receiving Module (206, 404):

The input manager 702 continuously receives the inputs from the input device 720, such as through a touch panel, key, or bezel, and processes them to suitably provide relevant input information to a context-generator 704 and an action-handler 706, as explained later in the description. The input manager 702 enables the context generator 704 to update the current context of the device based upon the user interaction being performed.

The input manager 702 analyzes the input data received from input device 720, and determines whether the user interaction is being performed with respect to control element/an indicative point/static icon (i.e. second type of control element), and accordingly communicates the relevant information to the context generator 704 and the action handler 706.

Figure 8:
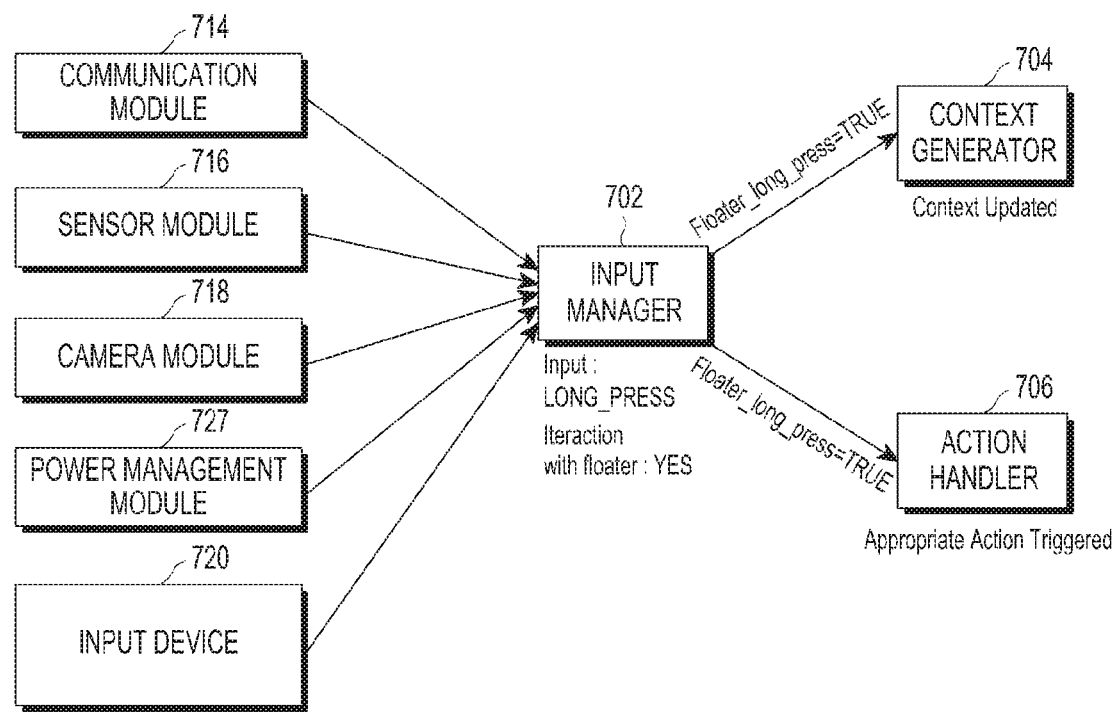
FIG. 8 further illustrates the implementation in FIG. 7.
Figure 9:
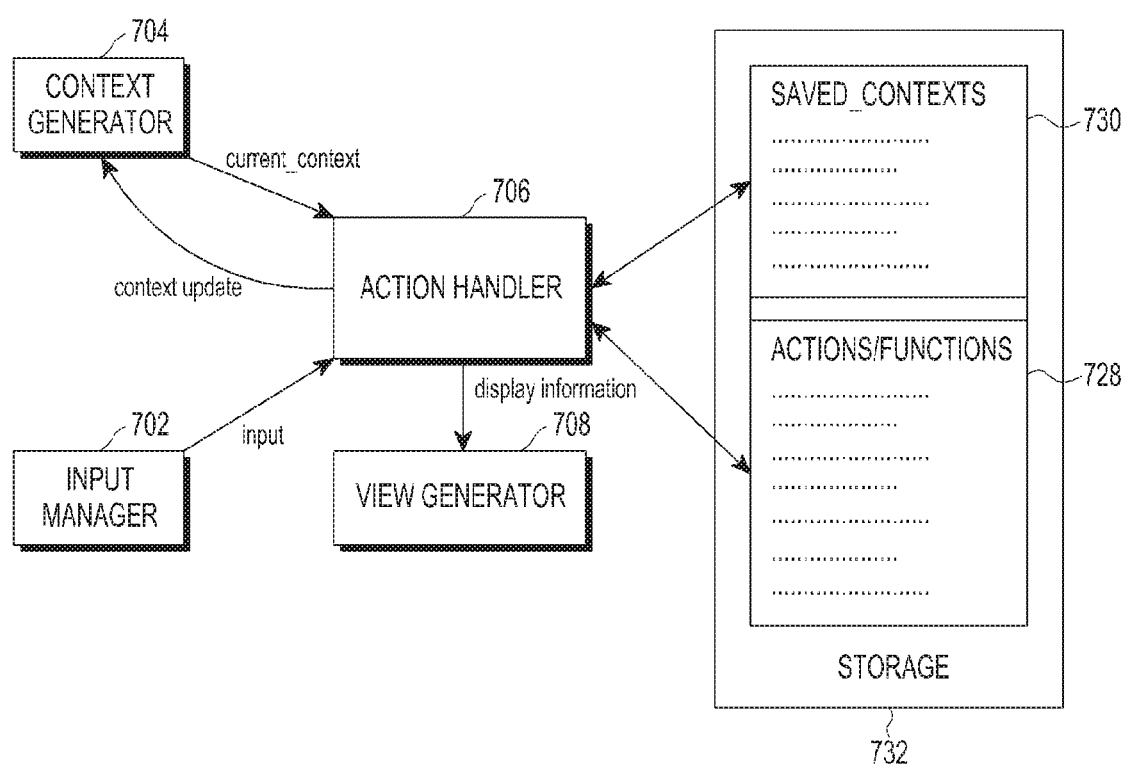
FIG. 9 further illustrates the implementation in FIG. 7.

An operation of the input manager 702 is illustrated in FIG. 8, which illustrates the input manager 702 receiving a long-press based input at the touchscreen surface of the mobile device acting as one of the input-providing means, and connected to the sensor module 716, communication module 714, camera module 718, a power management module 727, and the input device 720. Accordingly, the action handler 706 executes a particular application, such as presenting a certain type of control element, and the context generator 704 updates the context of the mobile device, such as by changing the UI.

b) Context Generator 704 Corresponding to the Processing Module (208, 406):

The context generator 704 is connected to a communication module 714, a sensor module 716, and a camera module 718, for example, and continuously updates the context of device and makes appropriate changes to the context based upon input information received from the input manager 702 and the current action information from the communication module 714, the sensor module 716, the camera module 718 and the action handler 706 to generate the latest context, utilizes the network-provided information to update the context, such as email and birthday notifications, and interrupts the action handler 706 whenever a relevant context change occurs so that appropriate action can be taken.

c) Action Handler 706 Corresponding to the Processing Module (208, 406):

The action handler 706 is the driving component of the floater module 700. Based upon the current context and input, the action handler 706 triggers appropriate actions, services requests from applications that utilize the API, and generates data for a view generator 708 for on-screen display. As illustrated in FIG. 9, the action handler 706 receives the current context and input from the context generator 704 and input manager 702, and continues checking for a new context relevant to the device based on comparing the currently active context (actions/functions) 728 of the device with the saved contexts 730 in the database (storage) 732. Upon having procured an appropriate context from the database 732 at least based on the currently-provided input, the action-handler 706 triggers appropriate actions and further assists the context generator 704 in updating the current context, and provides display information to the view generator 708.

d) View Generator 708 Corresponding to the Rendering Module (204, 402):

As a part of rendering the display, a view generator based sub-module suitably processes data received from the action handler 706 and feeds the data to the display module 710 or display screen, which then finally displays the UI.

e) Floater API 712 Corresponding to the Other Module:

The floater API 712 is provided to the native applications 722 and third-party applications 724 within the mobile device to provide their own control element based utilities, custom visual forms of the control element, indicative logos/icons, and register their own custom-events and provide methods/functions to be triggered if required.

Figure 10:
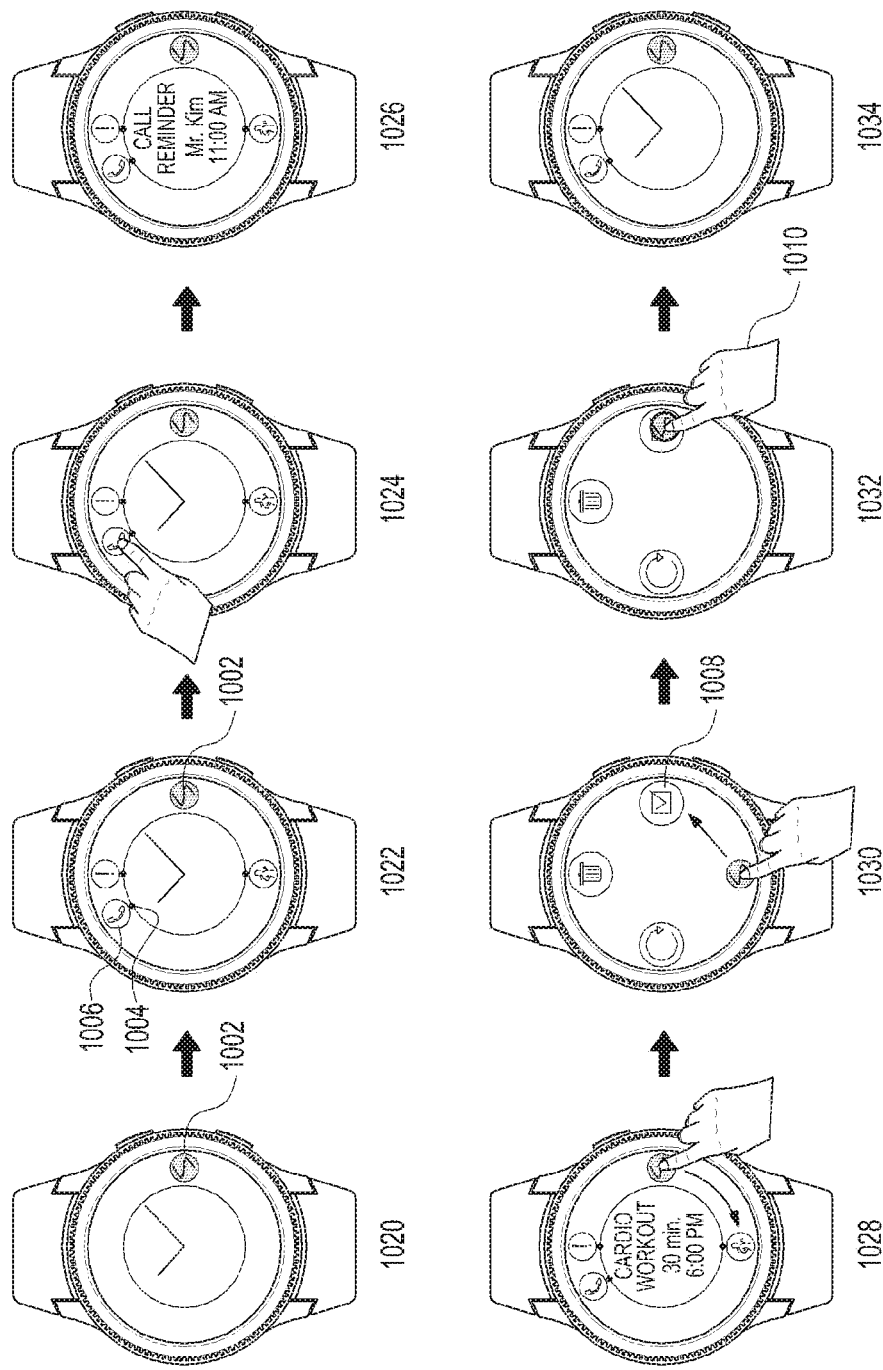
FIG. 10 illustrates an application according to an embodiment.
Figure 11:
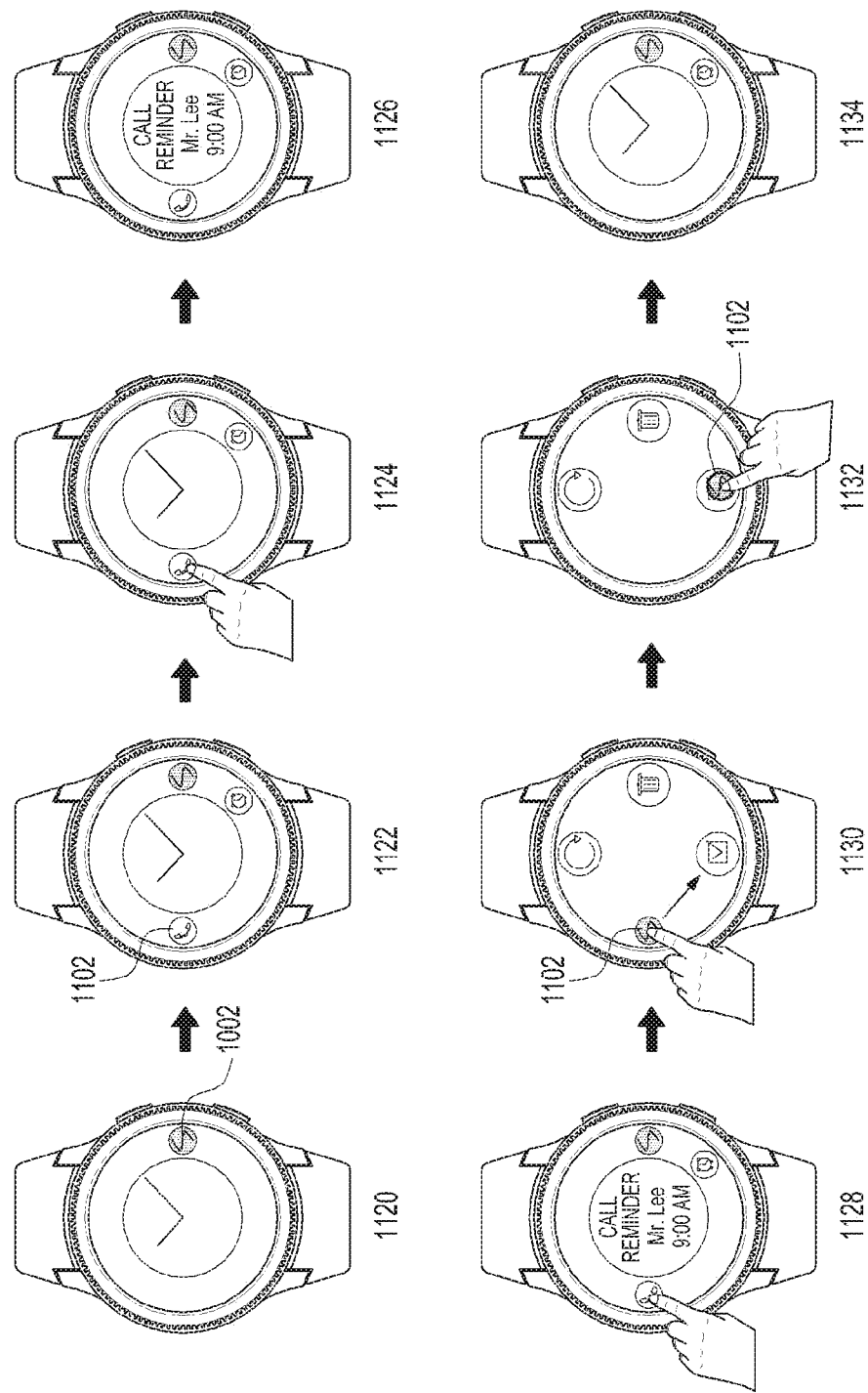
FIG. 11 illustrates another application according to an embodiment.

As a part of representation of a scheduled operation within the dial, any time-based operation can be represented intuitively using event indicative points or icons, as illustrated in FIGS. 10 and 11. For example, the indicative points/icons may be color-coded to indicate the nearness in time or priority of an event. The priority of such a future operation may either be explicitly set by the user or automatically set as a result of some context change. For example, any operation that is about to occur in the near future has a red-colored indicative point, whereas an event that is scheduled later has a green colored indicative point. In case an operation is having multiple trigger-conditions set as conditions, the indicative point may change color if any of the set conditions undergoes a change, such as in time or location.

FIGS. 10-20 illustrate applications according to embodiments and realizable through the electronics or interconnected-modules as illustrated in FIG. 6 to FIG. 9. The first type of control element and movable second type of control elements will be interchangeably referred as a "floater" throughout FIGS. 10-20.

FIG. 10 illustrates an application according to an embodiment.

In step 1020, the movable control element or the first type of control element 1002, interchangeably referred to as a floater, lies at the dial of the smartwatch. While the floater has been shown as default, the floater may be also shown in response to some user actuation or any automatically-sensed event.

In step 1022, the visual identifiers 1004 or event-indicative points of various reminders are displayed along the inner-circumference of the dial, such as upon receiving a user-provided tap over the floater 1002. For example, the reminders may have been pre-set by the user and include a call reminder at 11:00 AM, such as in step 1026, a miscellaneous reminder at 12:00 PM, and a 30-minute workout reminder at 6:00 PM, such as in step 1028.

The points 1004 have small logos or symbols 1006 to indicate the associate reminder type. Such symbols 1006 may be also referred to as second types of control elements that are now seen along with the first type of control element 1002. The color of the points 1004 varies as per the proximity of the event/reminder or its priority/urgency (from red, for an event that is about to happen or has high priority to green, for an event that is scheduled later or has low priority). As in above example, the call reminder set at 11:00 AM has a red-colored indicative point, since its reminder event is imminent or about to occur, such as when the current time is 10:50 AM. The color of the indicative point may also be based on event priority.

Steps 1024 and 1026 show a user-selection of the symbol 1006 and display of a brief description of the corresponding reminder.

Steps 1028, 1030 and 1032 collectively show alteration of the attributes of a set event/reminder. In step 1028, the floater 1002 is dragged to an appropriate indicative point 1006 where it is held until a menu appears in step 1030. The floater 1002 may be dragged and dropped at any of various options 1008 or additional second types of control elements 1008 acting as drop-points, which are immovable and merely enable registering of inputs. In above example, the user marks the workout-reminder as done in step 1032 by dragging the floater 1002 to the appropriate menu-option 1008, as indicated in 1010. Thus, the corresponding indicative point 1004 and the logo 1006 is removed from the watch face UI thereafter.

Step 1034 shows the restoration of the watch-face UI.

In FIG. 11, steps 1120 to 1132 correspond to steps 1020 to 1032 of FIG. 10, and thus, their detailed description will be omitted. FIG. 11 differs from FIG. 10 in that instead of representation of indicating points 1004 and logos 1006 as non-movable entities as in FIG. 10, FIG. 11 represents corresponding entities as second types of control element based movable-icons 1102. Accordingly, the icons 1102 representing the reminders are movable for undergoing a drag and drop operation for discharging various utilities, as illustrated in steps 1130 and 1132.

Figure 12:
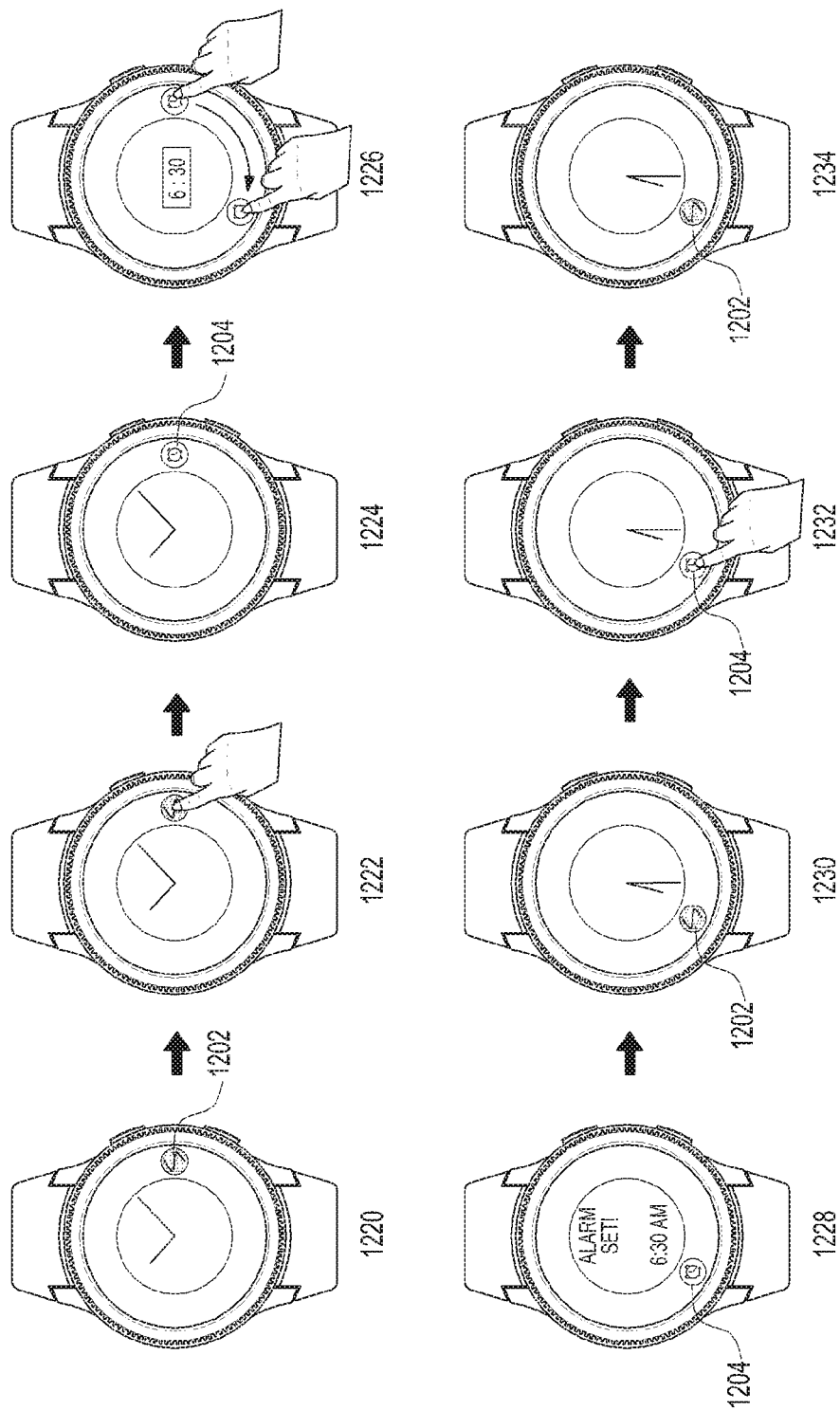
FIG. 12 illustrates another application according to an embodiment.

FIG. 12 illustrates another application according to an embodiment.

Step 1220 corresponds to step 1020 of FIG. 10.

Step 1222 represents receipt of a single tap upon a floater 1202, i.e. the first type of control element.

Step 1224 corresponds to step 1022 in FIG. 10 and accordingly represents conversion of the first type of control element 1202 or the floater 1202 to a different-form as a second type of control element 1204, i.e. alarm-clock symbol representing a wakeup-alarm setting mode, wherein such control element 1204 is movable in nature.

In step 1226, the second type of control element 1204 is dragged and dropped to a designated parameter, i.e. an appropriate time-position 6:30 am within the dial. Accordingly, step 1226 corresponds to the operations 106 and 304.

In step 1228, the alarm is set at 6:30 AM and the second type of control element 1204 is shown at the corresponding location within the dial as representing the scheduled alarm.

In step 1230, the second type of control element 1204 changes its form back to the first control element 1202.

As shown in step 1220 to step 1232, the first type of control element 1202 changes its form again to the second type of control element 1204 i.e. the alarm-watch symbol, which blinks with a different-color such as when the alarm goes off, and communicates alerts through the second type of control element 1204 acting as the identifier of the preset alarm.

Figure 13:
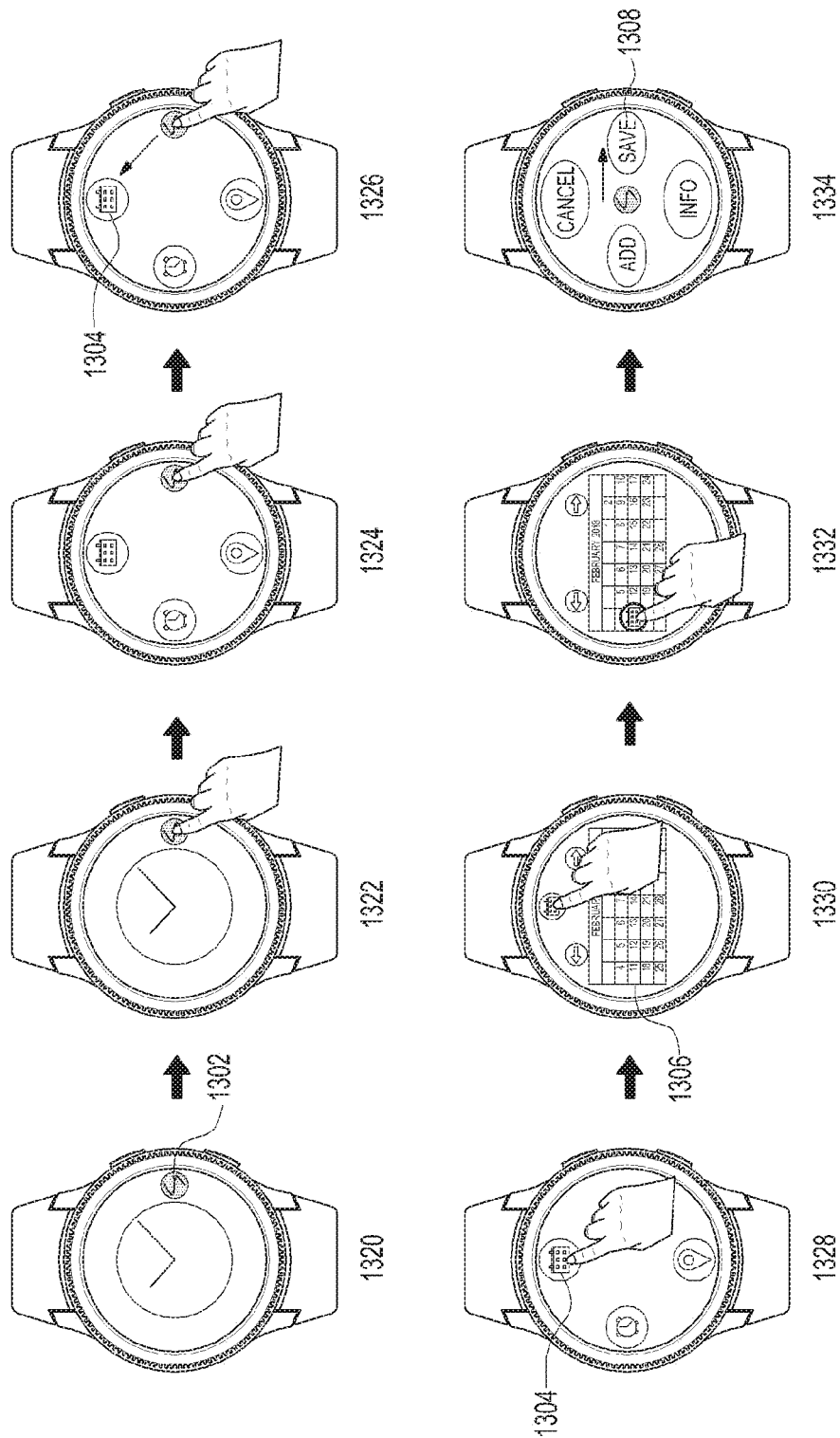
FIG. 13 illustrates another application according to an embodiment.

In step 1234, the blinking second type of control element 1204 changes its form back to the first type of control element 1202, upon having received a tap upon it to turn off the alarm, FIG. 13 illustrates another application according to an embodiment.

In step 1320, the floater 1302 or the first type of control element 1302 lies along the dial of the smartwatch and corresponds to step 1020 of FIG. 10.

In step 1322, the floater 1302 as the first type of control element is long pressed by the user to register a user input.

In step 1324, the underlying or on-screen UI is changed and floater as the first type of control element 1302 is shown alongside a plurality of second type of control elements.

In step 1326, depending upon what type of reminder is to be set (calendar/clock/location), the floater 1302 is dragged upon the appropriate section (hold point) 1304 or the second type of control element 1304.

In step 1328, as the floater 1302 is dragged upon a calendar section acting as the second type of control element 1304 or the hold-point, the floater 1302 changes its form to indicate a calendar reminder setting mode. The on-screen UI changes to Calendar UI 1306 in step 1330, where the calendar UI 1306 also acts as the second type of control element.

In step 1332, the floater 1302 is suitably navigated through months and dropped on an appropriate day (drop-point) within the calendar UI.

In step 1334, if the floater 1302 is dragged and dropped on a particular day within the calendar, an additional menu appears as an additional second type of control element with the floater 1302 positioned at the center. Such menu provides options of saving the reminder, add information regarding reminder, add another condition to reminder or cancel an existing reminder. While such menu options are also second types of control elements, they merely act as drop-points to receive the user input and are non-movable in nature. In step 1334, the floater 1302 is dragged and dropped over a SAVE drop-point 1308 to save the reminder, thereby setting the reminder.

Figure 14:
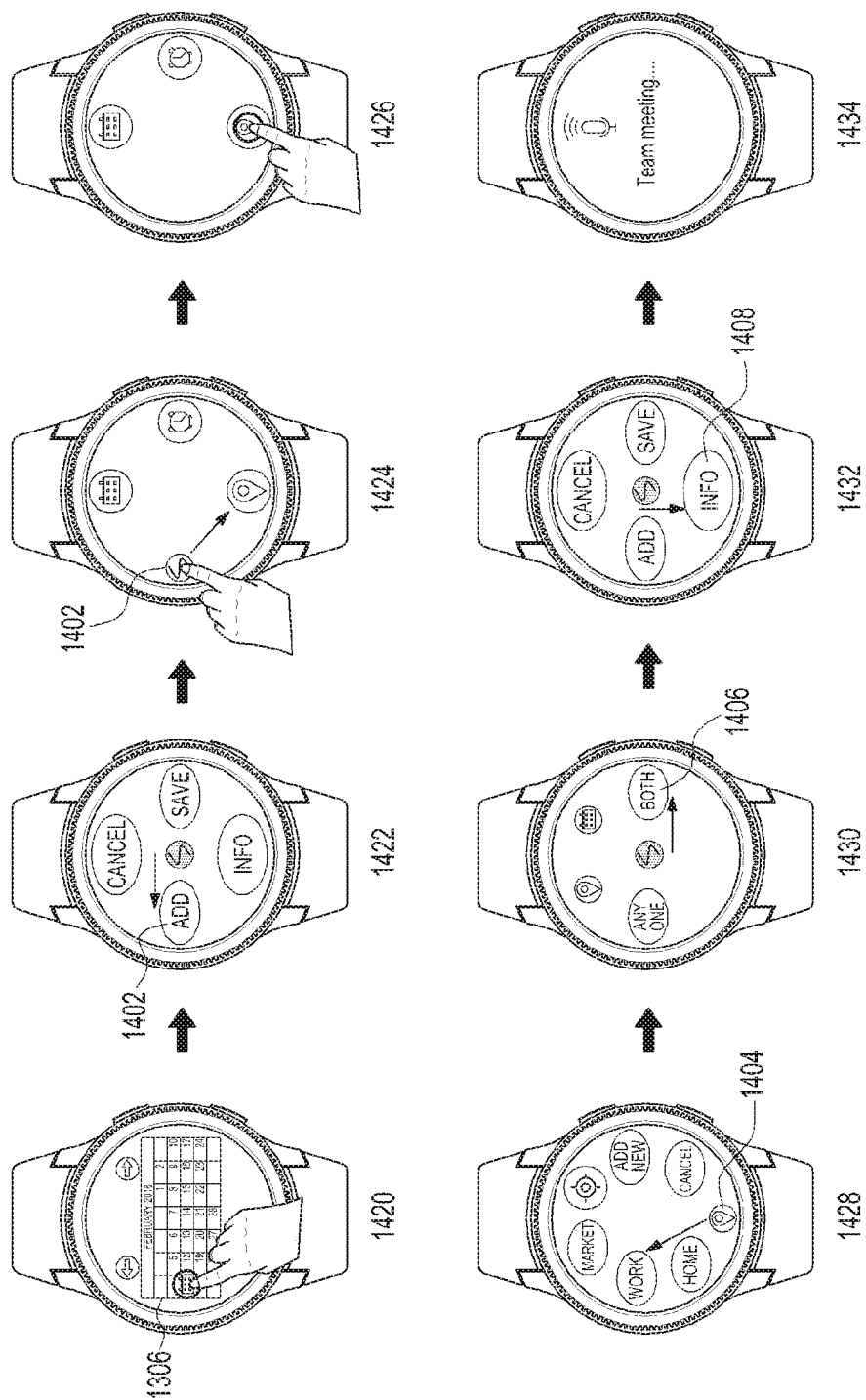
FIG. 14 illustrates a continuation of the application in FIG. 13, according to an embodiment.

FIG. 14 illustrates another application according to an embodiment and is an extension of FIG. 13. That is, step 1420 in FIG. 14 is the continuation point from step 1334 in FIG. 13.

In step 1422, the floater 1402 or the first type of control element 1402 is dragged and dropped onto an ADD based drop-point within the menu to add a new condition to the preset reminder in FIG. 13.

In steps 1424 and 1426, a fresh menu re-appears, such that the first type of control element 1402 is dropped on a location based drop-point.

In step 1428, a further menu as the second type of control element appears with options such a) pre-configured locations, b) control-options to add new location, c) or use current location with respect to the contemplated reminder.

In step 1428, the floater 1402 is dropped over a location or drop-point referred to as work 1404.

In step 1430, after having set the location, another menu appears as the second type of control element to determine whether the contemplated reminder shall be provided based on any one or both of the conditions, i.e. a reminder condition as has been set in FIG. 13 and the currently set location based condition. While ANY ONE based option triggers the reminder if any one of the given conditions is met, BOTH triggers the reminder only if both the conditions are met. In step 1430, BOTH 1406 is selected.

In step 1432, after having selected the BOTH condition in step 1430, another menu appears, according to which the user may add another condition. Option 1408 in the menu as selected facilitates a user to add a descriptor-information regarding the reminder using voice input. The reminder is finally saved by dropping the floater 1402 over the SAVE drop point.

Based on the method in FIG. 13 and FIG. 14, the user will be reminded only if he or she is at their work-place on a specified date, and the user is communicated alerts.

Figure 15:
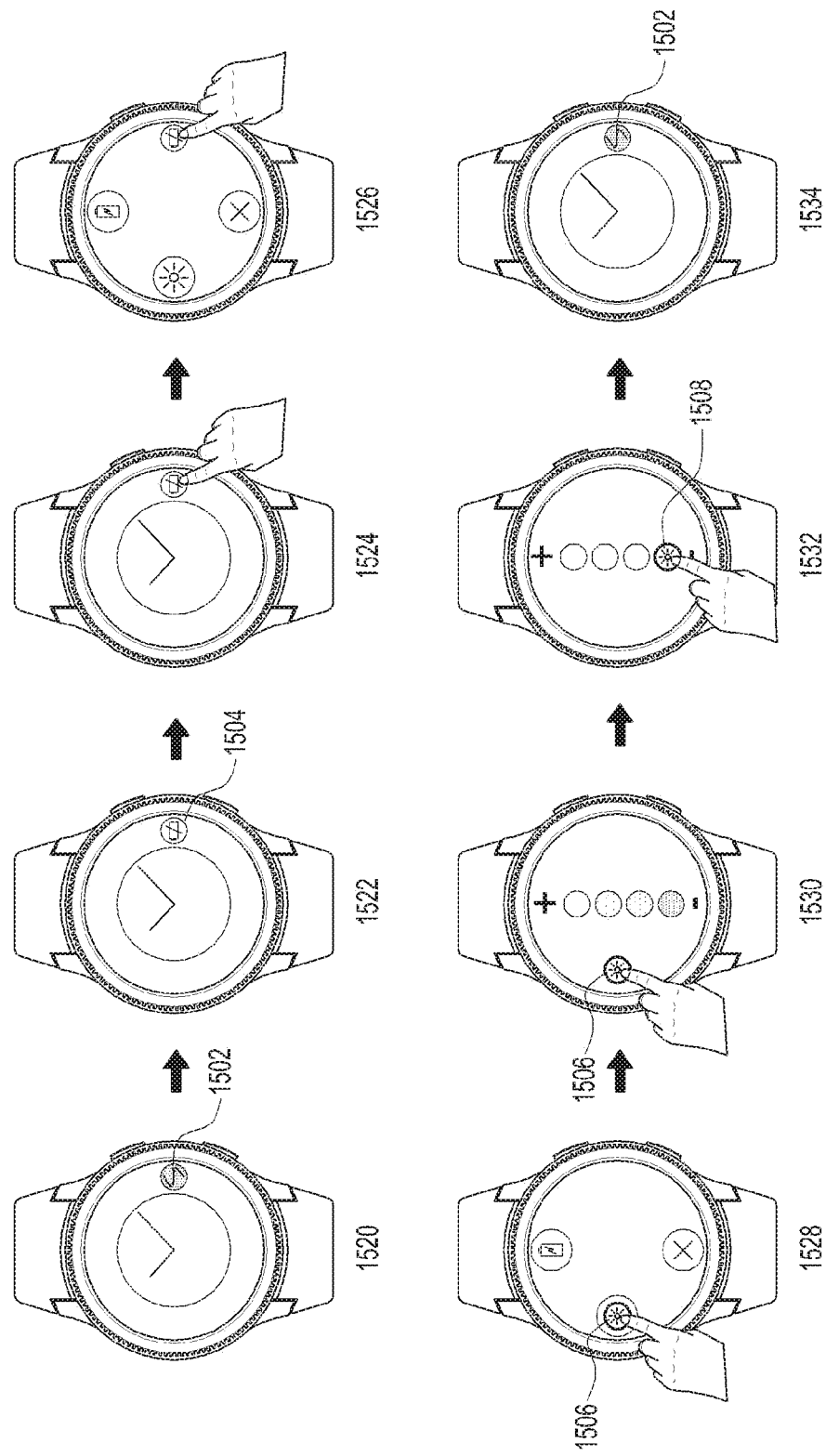
FIG. 15 illustrates another application according to an embodiment.

FIG. 15 illustrates another application according to an embodiment.

Step 1520 corresponds to step 1020 of FIG. 10.

In step 1522, in case of a low battery event, the floater 1502 or the first type of control element 1502 automatically changes its form or shape as referred to in 1504, to indicate the occurrence of the same. Other types of events as have been described in reference to FIG. 1 for triggering the change in shape of the first type of control element 1502 are also conceivable.

In step 1524, the newly shaped floater 1504 is long pressed.

In step 1526, the underlying UI changes to provide various second types of control elements or menu-options, such as enabling power-saving mode (drop point), adjusting brightness (hold point), and dismissing the event (drop point)

As shown in step 1528, as the newly shaped floater 1504 is dragged to a brightness-adjustment option (hold-point), the underlying UI changes to support brightness adjustment, and the floater 1504 changes its form to indicate brightness adjustment mode 1506.

In steps 1530 and 1532, the floater 1504 is dropped at appropriate brightness-level (drop point) 1508 to set the brightness.

In step 1534, a watch-face UI is thereafter restored along with the original form of floater 1502.

Figure 16:
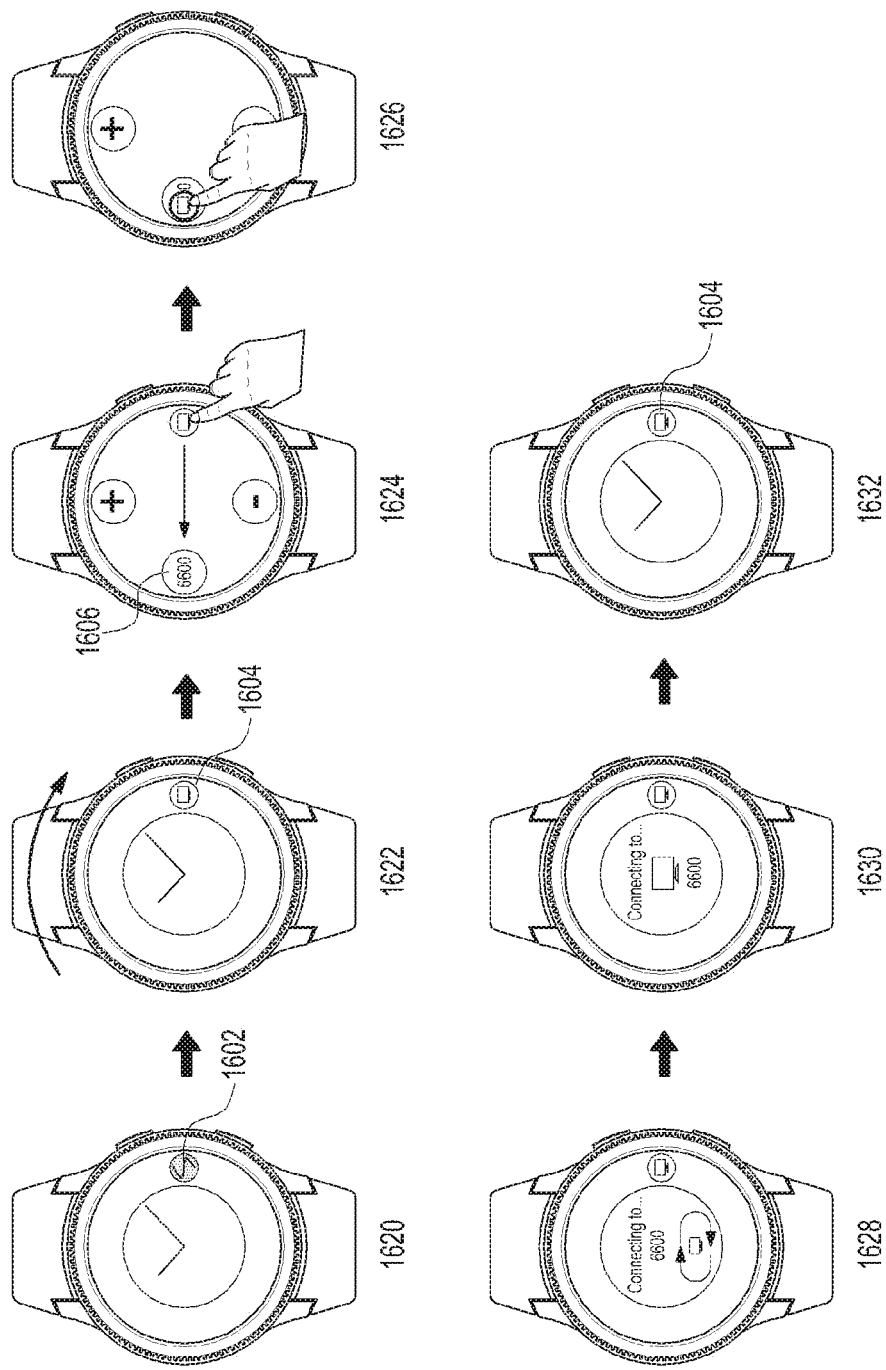
FIG. 16 illustrates another application according to an embodiment.

In addition to the aforesaid low-battery scenario, the floater 1502 or the first type of control element may also automatically change its visual form based upon the devices context in step 1522, in at least one of the following scenarios:

Incoming call/other communication;
Sensing of a Gesture/Input, such as a shaking arm, tap on floater, rotating bezel, or pressing external button;
Sensing of Users state, such as running, driving, or location;
Change of on-screen UI, such as while accessing a utility; Change in external environment; Storage-related events, such as full or secure digital (SD) card inserted/removed;
Source device events, such as shake or touch the device; and
Parent device related events, such as phone battery low or storage full, FIG. 16 illustrates another application according to an embodiment.

Step 1620 corresponds to step 1020 of FIG. 10.

In step 1622, the bezel located at the smartwatch may be rotated clockwise to provide a user input. Accordingly, the floater 1602 or the control element 1602 starts exhibiting different forms associated with different utilities. In an example, the bezel may be stopped from rotation, if the floater 1602 assumes the form of TV-Control 1604 as the first type of control element, as per the operating-users discretion.

The floater 1604 in step 1622 may be long-pressed as a user actuation in order to trigger a change of the underlying UI within the smartwatch.

In step 1624, upon the user actuation of the floater 1604, the underlying UI changes dynamically and provides options such as connect to a previously paired device 6600, and add a new device or dismiss, as drop points or second types of control elements.

In step 1626, the floater 1604 is dragged and dropped to the paired-device 6600.

In steps 1628 and 1630, the connection establishing to device 6600 begins in step 1628 and concludes in step 1630.

In step 1632, upon establishment of a successful connection, the watch-face UI is restored with the floater-button 1604 having a changed color to indicate a connection established with a television (TV).

If connection gets automatically established when the TV is turned ON, such an event automatically triggers the changing of floater 1602 to the predefined form, i.e. connected with TV form as otherwise gradually attained in step 1632. This accounts for automatic context based change of form of the floater 1602.

FIG. 16 as shown can be expanded to cover various other scenarios wherein the smartwatch can connect to various electronic devices or mechanical devices having embedded systems which are capable of being networked with the smartwatch through a peer-to-peer network (P2P) connection. The device may also be capable of being included in an Internet of things (IoT) based network and accordingly remotely operable through the smartwatch.

Figure 17:
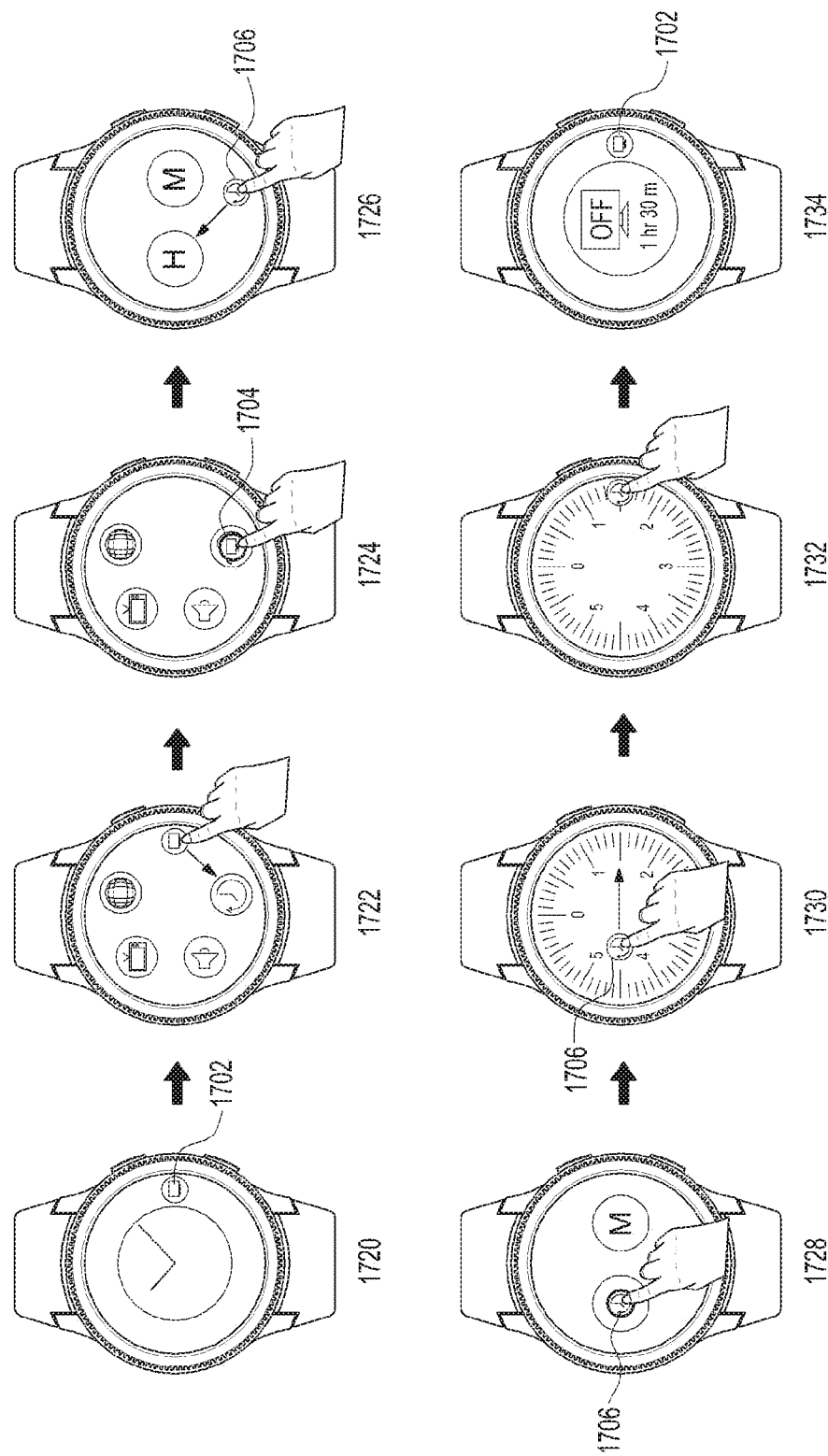
FIG. 17 illustrates a continuation of the application in FIG. 16, according to an embodiment.

FIG. 17 illustrates another application according to an embodiment and is a continuation of the method illustrated in FIG. 16.

Step 1720 corresponds to step 1632 of FIG. 16, such that the floater 1702 lies alongside the dial as the first type of control element. The color and form of the floater 1702 indicates that the smartwatch already stands connected to the TV.

In step 1722, upon a user actuation of the floater 1702, the underlying UI changes dynamically to provide second types of control elements or options such as switching to browser control UI or analog-TV control UI, or adjust volume or set an OFF timer.

In step 1724, the floater 1702 is dragged to an OFF timer option (hold point) 1704.

In step 1726, the floater 1702 automatically changes its form to a timer 1706 based shape as a result of step 1724. The underlying UI also changes to provide options or second types of control elements to set the timer in hours or minutes.

In step 1728, as the time-shaped floater 1706 is dragged to the appropriate option (hold point), the underlying UI again changes to show time-based graduations in step 1730.

In step 1732, the floater 1706 is dropped appropriately along the bezel at any of the time based graduations as shown within the dial.

In step 1734, a TV switch-off time is set to 1 hour 30 minutes. Thereafter, the watch face is restored back to its initial position.

In addition to the scheduling of TV operation, various operational and navigation related core-functions of the TV, which are illustrated as selectable controls in a graphical-user interface, may be presented through the combination of first and second types of control elements within the smartwatch or any other mobile/computing device.

Figure 18:
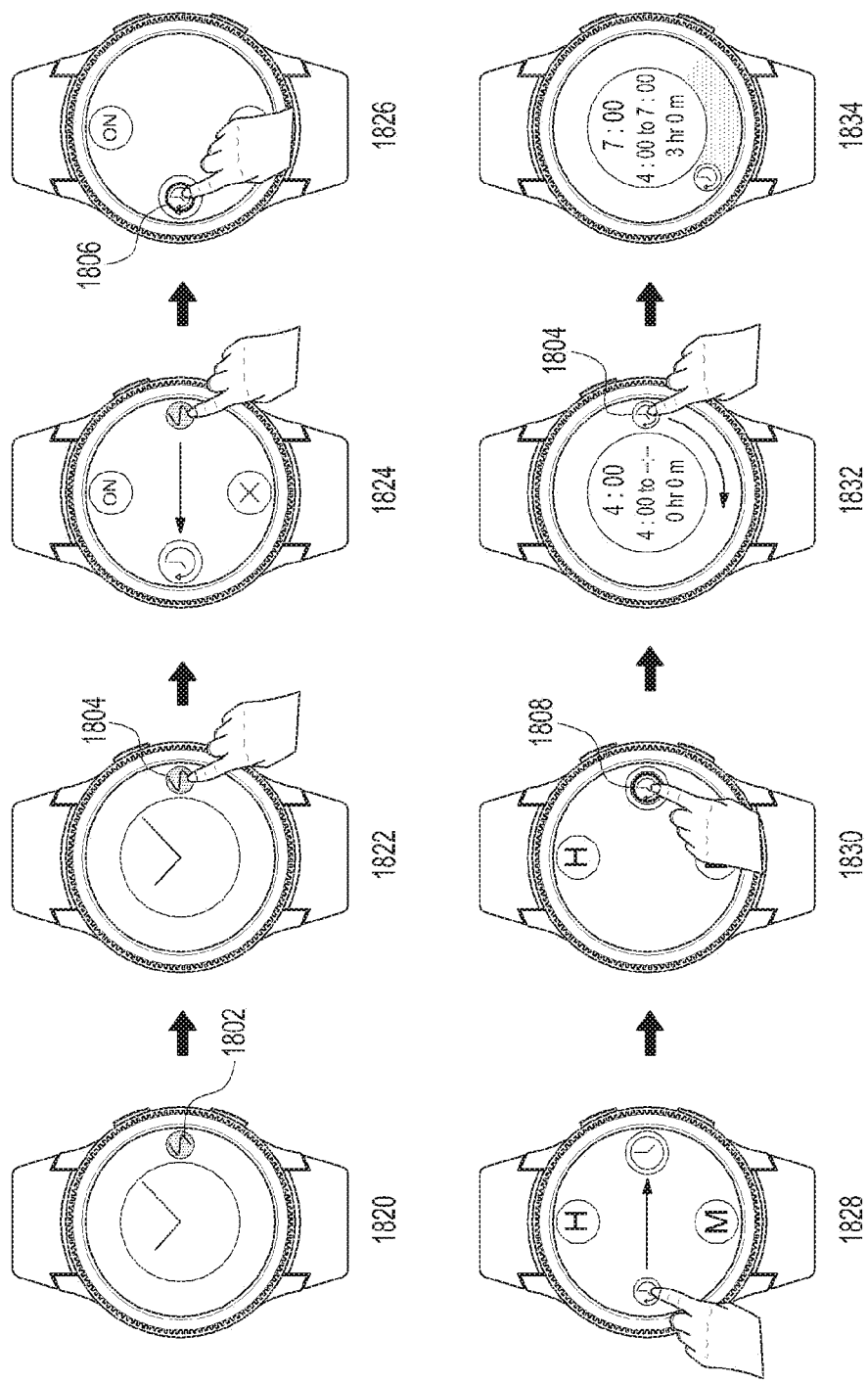
FIG. 18 illustrates another application according to an embodiment.

FIG. 18 illustrates another application according to an embodiment.

Step 1820 corresponds to step 1020 of FIG. 10.

In step 1822, the bezel located at the smartwatch may be rotated clockwise to provide a user input. Accordingly, the floater 1802 or the control element 1802 starts exhibiting different forms associated with different utilities. For example, the bezel may be stopped from rotation, when the floater 1802 assumes the form of Airplane mode 1804 as the first type of control element, as per the operating users discretion.

The floater 1804 in step 1822 may be long-pressed as a user actuation in order to trigger a change of the underlying UI within the smartwatch.

In step 1824, upon the user actuation of the floater 1804, the underlying UI changes dynamically and provides options such as turn airplane mode on, schedule airplane mode or dismiss, as second types of control elements.

In steps 1824 and 1826, the floater 1804 is dragged over one of the second type of control elements based option 1806 to schedule the airplane-mode option.

In step 1828, the forms of the floater 1804 as well as the underlying UI change to support time duration input. Various second type of control elements or options may be shown to receive the user input in terms of hours, minutes or dial graduations of the smartwatch.

In step 1830, the floater 1804 with the new form is dragged and dropped over an option 1808 pertaining to dial graduations of the watch, based on the option in step 1828.

In step 1832, the floater 1804 is dropped within the updated UI of the dial at a particular location to mark the start time of the airplane mode. Thereafter, the floater 1804 is dragged and dropped again along the bezel to mark the end time of the airplane mode. In an alternate example, to set time duration for the airplane mode, the user may simultaneously use one finger to mark the start point and another finger may be dragged along the dial to mark the end point.

In step 1834, the airplane mode is scheduled for 3 hours from 4:00 to 7:00. Thereafter, the watch face-UI is restored with an indicative time range of the airplane mode.

Figure 19:
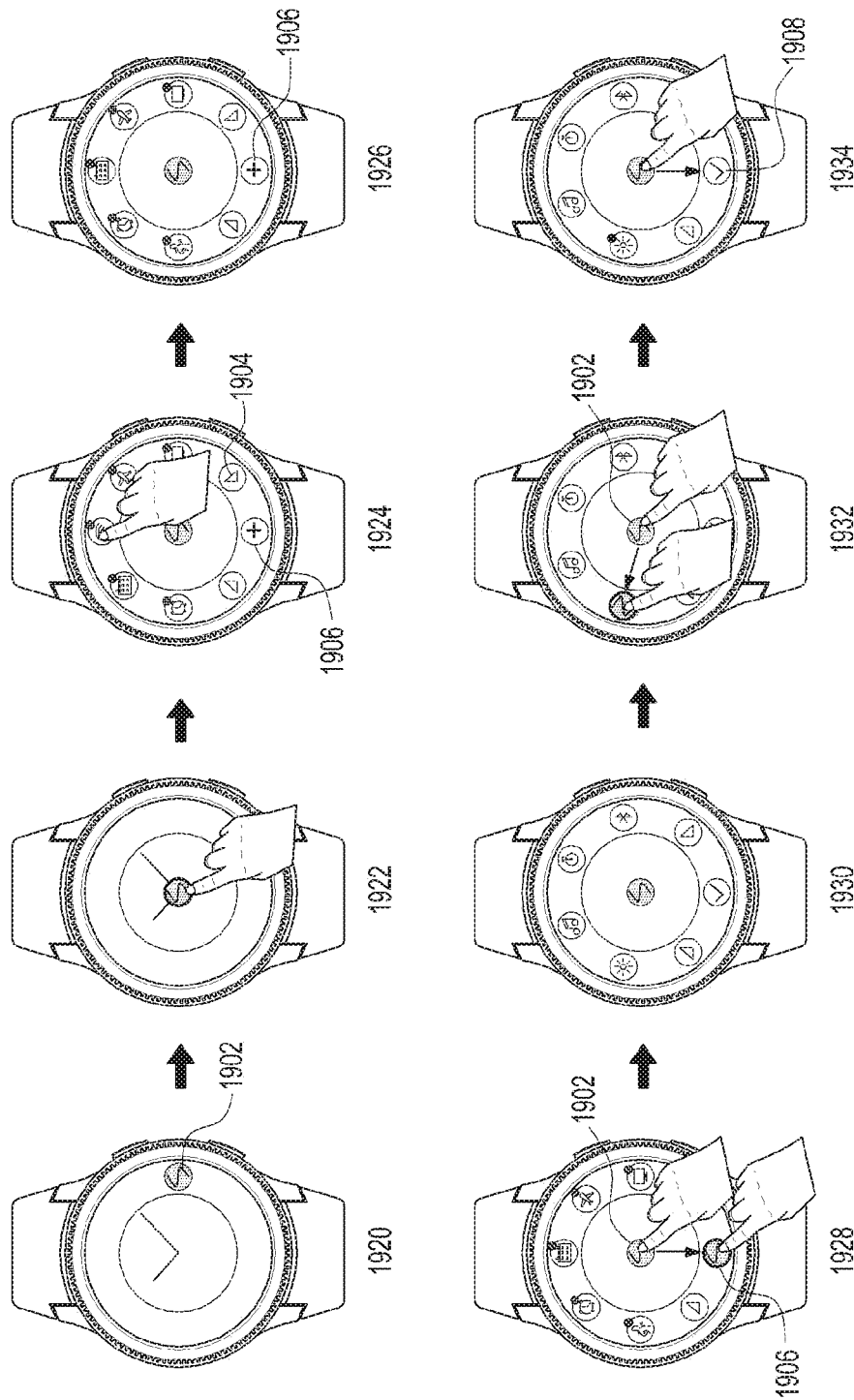
FIG. 19 illustrates another application according to an embodiment.

FIG. 19 illustrates another application according to an embodiment and illustrates options to select or deselect utility-items for display at the home-screen of the smartwatch.

Step 1920 corresponds to step 1020 of FIG. 10.

In step 1922, the floater or the first type of control element 1902 is dragged to center of display and is long pressed.

In step 1924, a setting-menu appears comprising existing home-screen utility items, navigation hold points 1904 and add new setting drop point 1906. To remove a floater item, the floater 1902 may be dragged and dropped over the particular utility item.

In step 1926, the item is removed and the home-screen menu list is updated.

In step 1928, the floater 1902 may be dragged and dropped over add new setting based drop point 1906.

In step 1930, a navigable list of available floater items appears.

In step 1932, to add an item, the floater 1902 is dragged and dropped over the utility item desired to be added.

In step 1934, the floater 1902 is dragged and dropped over the finish drop point 1908. Settings are saved and the home-screen UI of the device i.e. smartwatch is restored.

In addition to the scenarios in FIG. 11 to FIG. 19, the aforesaid first/second type of control elements may be dragged and dropped to relevant hold/drop points to realize a number of other mobile device applications, such as:

Notification management/handling;

Voice-Call management/handling (answer, reject, reject with a message, remind, ignore);

Control of auxiliary instruments, such as controlling music over Bluetooth® headset/watch speaker);

Attribute management of a source devices (volume/brightness/audio profiles/connectivity (Bluetooth, WiFi, near field communication (NFC) adjustment);

Attribute-management of a parent-device, such as a smartphone connected to a smartwatch);

Application-management (uninstall/disable/update an app of mobile device);

Date and time management (setting time when entering a different time zone);

Remote device control (TV/Oven)/home automation;

Activity management of user by monitoring user-activity and health-tracking; and Control of music player/FM radio (play, pause, previous, next, equalizer).

The first/second types of control elements provide an interactive media to access a utility or handle an event. Throughout the access of a utility within the smartwatch or any other mobile device, the first/second type of movable control element(s) are continuously dragged according to the changing elements of the underlying UI, which changes to provide drop points and hold points over which the control element can be dragged and dropped.

When brought over a hold point, the underlying UI changes to support the next step of the utility. When brought over a drop point, releasing the contact with the control element results in accomplishment of the utility together with completion of desired operation. That is, access to the utility completes when the control element is finally dropped on a drop point or the contact with the control element is released. Thus, any user interaction with the device involves a single, prolonged contact with the control element ending with a drop of a floater on a drop point.

Any utility requiring raw data to be fed by the user has the data automatically interpreted from the manner in which the user drags the control element over the corresponding UI of the utility.

The interaction through the aforesaid movable control element is easy to realize with a single hand/finger and also addresses the problem of the small display size of the smartwatch. This also requires far fewer steps to be performed while accessing a utility, compared to the conventional art, and provides a higher degree of functionality to the dial/home screen UI of the smartwatch.

Accordingly, operation of the smartwatch by the user is simplified, irrespective of the type of utility being accessed or event being handled. The movable control element may also be appropriated in devices other than smartwatches, such as headgear which may or may not be linked with a main mobile device.

In addition of the above utilities and events, third party applications such as social-networking and movie-streaming can provide their own versions of control elements and associate their own custom utilities and events that can be executed by the UI.

Figure 20:
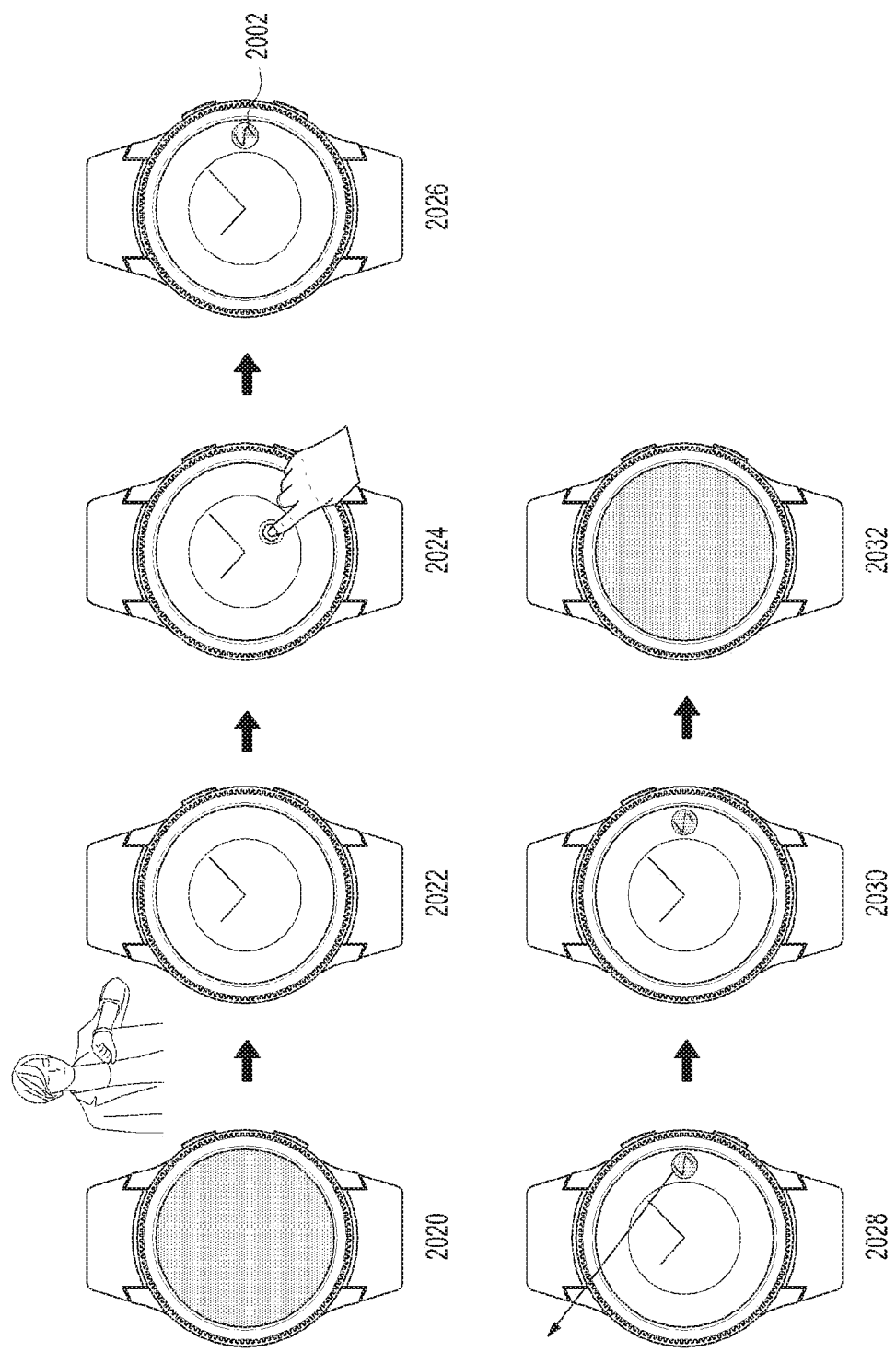
FIG. 20 illustrates another application according to an embodiment.

FIG. 20 illustrates another application according to an embodiment.

In step 2020, the smartwatch is in a stand-by mode.

In step 2022, the smartwatch wakes up by some user actuation or any-event and displays a clock UI.

In step 2024, a tap (or a user input) is received on a screen of the smartwatch. In step 2026, the movable control element or the first type of control element as the floater 2002 appears along the dial of the smartwatch.

In step 2026, the floater 2002 is hidden either after time out (if no further user input is detected) or if the user slides the floater 2002 swiftly in any direction in step 2028.

In step 2032, the smartwatch returns to the stand-by mode.

Figure 21:
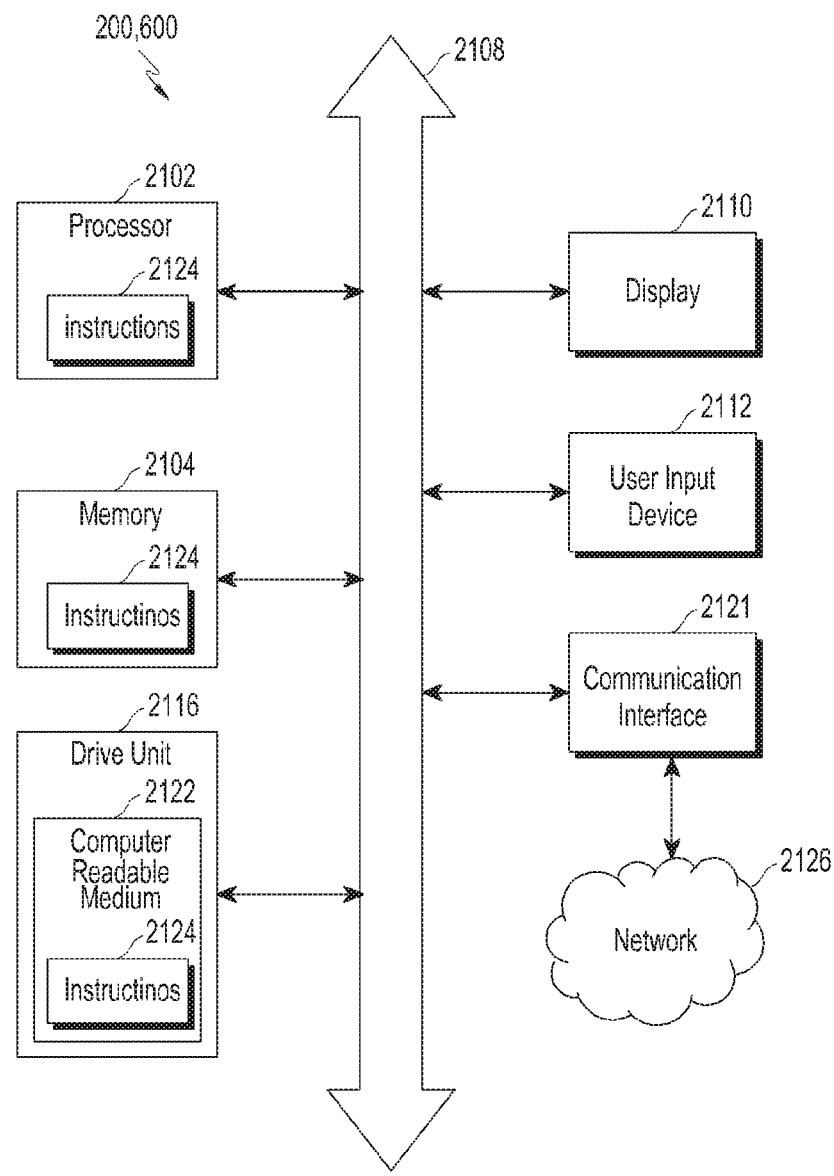
FIG. 21 illustrates a computing device based implementation of the system according to an embodiment.

FIG. 21 illustrates another implementation according to an embodiment, and another typical hardware configuration of the system 200, 400 in the form of a computer system is shown. The computer system can include a set of instructions that can be executed to cause the computer system to perform at least one of the methods disclosed, and may operate as a standalone device or may be connected by a network to other computer systems or peripheral devices.

In a networked deployment, the computer system may operate in the capacity of a server or as a client user computer in a server-client user network environment, or as a peer computer system in a peer-to-peer (or distributed) network environment. The computer system can also be implemented across various devices, such as a personal computer (PC), a tablet PC, a personal digital assistant (PDA), a mobile device, a palmtop computer, a laptop computer, a desktop computer, a communications device, a wireless telephone, a land-line telephone having a touch-screen user interface, or any other machine capable of executing a set of instructions (sequential or otherwise) that specify actions to be taken by that machine. The computer system may be a mobile computing device capable of being worn by a user, such as a smartwatch, an augmented-reality headgear, or a wearable mobile-phone, and while a single computer system is illustrated, the term "system" shall also be taken to include any collection of systems or sub-systems that individually or jointly execute a set, or multiple-sets, of instructions to perform at least one computer function.

The computer system may include a processor 2102 e.g., a central processing unit (CPU), a graphics processing unit (GPU), or both. The processor 2102 may be a component in a variety of systems, such as part of a standard personal computer or a workstation, may be at least one of general processors, digital signal processors, application specific integrated circuits, field programmable gate arrays, servers, networks, digital circuits, analog circuits, combinations thereof, or other now known or later developed devices for analyzing and processing data, and may implement a software program, such as code generated manually (i.e., programmed).

The computer system may include a memory 2104 that can communicate via a bus 2108. The memory 2104 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, or optical media. In one example, the memory 2104 includes a cache or random access memory for the processor 2102. In alternative examples, the memory 2104 is separate from the processor 2102, such as a cache memory of a processor, the system memory, or other memory. The memory 2104 may be an external storage device or database for storing data, and may be operable to store instructions executable by the processor 2102. The functions, acts or tasks illustrated in the figures or described may be performed by the programmed processor 2102 executing the instructions stored in the memory 2104, and are independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

As shown, the computer system may further include a touch-sensitive display unit 2110, for outputting determined information as well as receiving a touch-gesture based input, such as drag and drop, single tap, and multiple-taps, and may act as an interface for the user to see the functioning of the processor 2102, or specifically as an interface with the software stored in the memory 2104 or in the drive unit 2116.

Additionally, the computer system may include an input device 2112 configured to enable a user to interact with any of the components of system. The computer system may also include a disk or optical drive unit 2116 that includes a computer-readable medium 2122 in which at least one set of instructions 2124 can be embedded. The instructions 2124 may embody at least one of the methods or logic as described, and may reside completely, or at least partially, within the memory 2104 or within the processor 2102 during execution by the computer system.

The present disclosure contemplates a computer-readable medium that includes or receives and executes instructions 2124 responsive to a propagated signal so that a device connected to a network 2126 can communicate voice, video, audio, images or any other data over the network 2126. The instructions 2124 may be transmitted or received over the network 2126 via a communication port or interface 2120 or using a bus 2108. The communication port or interface 2120 may be a part of the processor 2102 or may be a separate component, may be created in software or may be a physical connection in hardware, and may be configured to connect with a network 2126, external media, the display 2110, or any other components in the computer system, or combinations thereof. The connection with the network 2126 may be established wirelessly as discussed later. The additional connections with other components of the computer system may be established wirelessly. The network 2126 may alternatively be directly connected to the bus 2108.

The network 2126 may include wireless networks, Ethernet audio video bridging (AVB) networks, or combinations thereof. The wireless network may be a cellular telephone network, an 802.11, 802.16, 802.20, 802.1Q or WiMax network. The network 2126 may be a public network, such as the Internet, a private network, such as an intranet, or combinations thereof, and may utilize a variety of networking protocols now available or later developed including, but not limited to transmission control protocol/Internet protocol (TCP/IP) based networking protocols. The system is not limited to operation with any particular standards and protocols. For example, standards for Internet and other packet switched network transmission (e.g., TCP/IP, UDP/IP, hypertext markup language (HTML), hypertext transport protocol (HTTP) may be used.

The computer system may additionally include a plurality of built-in sensors to measure ambient conditions (room temperature, pressure, humidity) or physiological conditions (temperature, blood-pressure, heartbeat, pulse-rate) of the user wearing or possessing the computer system.

The present disclosure as illustrated aforesaid obviates the need of multiple user inputs otherwise required for launching individual apps and processing the data set. Thus, more than two control elements can be automatically linked while rendering a display, and the user input defined by touch-gestures is automatically transmitted in respect of at least one utilities. In other words, fewer inputs than those conventionally required to trigger the performance of at least one utility are necessary.

Accordingly, the present disclosure provides a time efficiency and an ease of usage by the user for executing a utility. The present disclosure aims at providing a handful of control elements that undergo drag and drop operations provided by the user to register user-provided inputs and cause at least one utility to be executed.

The present disclosure simplifies an entire process of navigation of a utility through at least through an auto grouping of the control elements in respect of at least one hierarchal level in a UI, such that one level triggers onset of other level after having received at least one drag and drop operation towards at least one control element at a particular level. Accordingly, the raw-data input for any utility or event is generated based upon how the control element has been dragged to at least one of hierarchal levels of the on-screen UI.

Thus, a user is provided an ease of operating upon mobile devices and computing devices through a handful of user inputs that are touch-gesture based, thereby simplifying access to any utility rendered by the computing device.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that at least one of the described elements may well be combined into a single functional element. Alternatively, certain elements may be divided into multiple functional elements. Elements from one embodiment may be added to another embodiment. For example, orders of processes described herein may be changed and are not limited to the manner described herein.

Moreover, the actions of any flow diagram need not be implemented in the order shown, nor do all of the acts necessarily need to be performed. Those acts that are not dependent on other acts may be performed in parallel with the other acts. The scope of embodiments herein is not limited by these specific examples. Numerous variations, whether explicitly given in the specification or not, such as differences in structure, dimension, and use of material, are possible. The scope of embodiments is at least as broad as given by the following claims.

While the present disclosure has been shown and described with reference to embodiments thereof, it will be understood by those skilled in the art that various changes in form and details may be made therein without departing from the spirit and scope of the present disclosure as defined by the appended claims and their equivalents.

What is claimed is:

1. A method implemented by a first device, the method comprising:

sensing at least one of a user input and an event occurring within a screen area of the first device;

displaying a first type of control element and a first parameter associated with the first type of control element on the screen area based on the sensing, the first type of control element being movable within the screen area;

receiving a first user interaction on the screen area, the first user interaction including a first dragging of the first type of control element to the first parameter located or of the first parameter to the first type of control element;

displaying a second parameter associated with the first parameter on the screen area based on the first user interaction;

receiving a second user interaction on the screen area, the second user interaction including a second dragging of the first type of control element to the second parameter or of the second parameter to the first type of control element; and executing at least one function of the first device or a second device connected to the first device based on a linkage of the first type of control element with the first and second parameters, wherein the first and second parameters are located and movable within the screen area.

2. The method of claim 1, wherein each of the first user interaction and the second user interaction includes at least one of:

a gesture interpretable by the first device;

at least one tap executed over a touch-sensitive surface defining the screen area;

a long-press subjected to the touch-sensitive surface;

a physical movement imparted to the first device by a user; or actuation of a control linked to the first device by the user.

3. The method of claim 1, wherein the event occurs based on at least one of:

an external condition or an internal condition electronically influencing the first device;

an environmental condition sensed by the first device; and a physiological condition of a user as sensed by the first device.

4. The method of claim 1, further comprising displaying a default element displayed on the screen area.

5. The method of claim 1, wherein executing the at least one function of the first device or the second device comprises at least one of:

setting up a condition pertaining to an operation of the first device or the second device;

altering a preset condition with respect to an operation of the first device or the second device;

scheduling a telecommunication or data communication related service through the first device or the second device; and controlling an operation of a remotely located device by the first device.

6. The method of claim 1, wherein executing the at least one function of the first device or the second device comprises at least one of:

setting up or alteration of alarms/reminders;

management of notification;

management of telecommunication;

controlling of at least one auxiliary device;

attribute management;

application management;

user activity tracking;

date and time management;

analysis of location based data;

analysis of data sensed by sensors linked to the first device; and configuration of a service renderable by the first device.

7. The method of claim 1, further comprising, in response to a third user interaction on the screen area including a selection the second parameter, displaying an alarm or a notification related to the at least one function.

8. The method of claim 1, wherein the first type of control element is dragged and dropped to the first parameter, and the first parameter is defined by at least one of:

at least one designated location within the screen area;

at least one minute and/or hour display indicator within a dial of the first device; and a second type of control element shown within the screen area and near the first type of control element, and wherein an occurrence of the second type of control element in the screen area is simultaneous with the occurrence of the first type of control element.

9. The method of claim 8, wherein the second type of control element includes at least one of:

a movable control element that is dragged within the screen area; and a stationary parameter adapted to receive the movable control element and register a condition with respect to the first device or update a registered condition.

10. The method of claim 8, wherein the second type of control element is represented by a color based on at least one of:

an approaching time of occurrence of a condition or a service; and a significance of the condition or service with respect to a user and/or the first device.

11. The method of claim 8, wherein the second type of control element is rendered along with a unique visual identifier within the screen area, and the unique visual identifier is adapted to at least one of:

exhibit a visual alert upon attainment of a condition or an execution of a service; and enable a user to further configure an underlying condition or service.

12. A first device, comprising:

a display;

a transceiver;

a sensor configured to sense at least one of a user input and an event occurring within a screen area of the first device; and at least one processor coupled to the transceiver, wherein the at least one processor configured to:

control the display to display a first type of control element and a first parameter associated with the first type of control element on the screen area based on the sensing, the first type of control element being movable within the screen area, receive a first user interaction on the screen area, the first user interaction including a first dragging of the first type of control element to the first parameter or of the first parameter to the first type of control element, control the display to display a second parameter associated with the first parameter on the screen area based on the first user interaction, receive a second user interaction on the screen area, the second user interaction including a second dragging of the first type of control element to the second parameter or of the second parameter to the first type of control element, and execute at least one function of the first device or a second device connected to the first device based on a linkage of the first type of control element with the first and second parameter, wherein the first and second parameters are located and movable within the screen area.

13. The first device of claim 12, wherein each of the first user interaction and the second user interaction includes at least one of:

a gesture interpretable by the first device;

at least one tap executed over a touch-sensitive surface defining the screen area;

a long-press subjected to the touch-sensitive surface;

a physical movement imparted to the first device by a user; or actuation of a control linked to the first device by the user.

14. The first device of claim 12, wherein the event occurs based on at least one of:

an external condition or an internal condition electronically influencing the first device;

an environmental condition sensed by the first device; and a physiological condition of a user as sensed by the first device.

15. The first device of claim 12, wherein the at least one processor is further configured to display a default element on the screen area before displaying the first element.

16. The first device of claim 12, wherein the processor is further configured to execute the at least one function of the first device or the second device as at least one of:

setting up a condition pertaining to an operation of the first device or the second device;

altering a preset condition with respect to an operation of the first device or the second device;

scheduling a telecommunication or data communication related service through the first device or the second device; and controlling an operation of a remotely located device by the first device.

17. The first device of claim 12, wherein the processor is further configured to execute the at least one function of the first device or the second device as at least one of:

setting up or alteration of alarms/reminders;

management of notification;

management of telecommunication;

controlling of at least one auxiliary device;

attribute management;

application management;

user activity tracking;

date and time management;

analysis of location based data;

analysis of data sensed by sensors linked to the first device; and configuration of a service renderable by the first device.

18. The first device of claim 12, wherein the at least one processor is further configured to, in response to a third user interaction on the screen area including a selection the second parameter, control the display to display an alarm or a notification related to the at least one function.

19. The first device of claim 12, wherein the first type of control element is dragged and dropped to the first parameter, the first parameter being defined by at least one of:

at least one designated location within the screen area;

at least one minute and/or hour display indicator within a dial of the first device; and a second type of control element shown within the screen area and near the first type of control element, and wherein an occurrence of the second type of control element in the screen area is simultaneous with the occurrence of the first type of control element.

20. The first device of claim 19, wherein the second type of control element includes at least one of:

a movable control element that is dragged within the screen area; and a stationary parameter adapted to receive the movable control element and register a condition with respect to the first device or update a registered condition.

21. The first device of claim 19, wherein the second type of control element is represented by a color based on at least one of:

an approaching schedule of occurrence of a condition or a service; and a significance of the condition or service with respect to a user and/or the first device.

22. The first device of claim 19, wherein the second type of control element is rendered along with a unique visual identifier within the screen area, and the unique visual identifier is adapted to at least one of:

exhibit a visual alert upon attainment of a condition or an execution of a service; and enable a user to further configure an underlying condition or service.

* * * * *